(12) United States Patent
Rinkenbaugh et al.

(10) Patent No.: US 10,513,179 B2
(45) Date of Patent: Dec. 24, 2019

(54) ADJUSTABLE PTO MOUNTING DEVICES AND METHODS

(71) Applicant: Muncie Power Products, Inc., Muncie, IN (US)

(72) Inventors: John Rinkenbaugh, Collinsville, OK (US); Dave Gormley, Sapulpa, OK (US); David Houston Freeman, Claremore, OK (US); James Robert Abbott, Muncie, IN (US)

(73) Assignee: Muncie Power Products, Inc., Muncie, IN (US)

( * ) Notice: Subject to any disclaimer, the term of this patent is extended or adjusted under 35 U.S.C. 154(b) by 0 days.

(21) Appl. No.: 15/373,706

(22) Filed: Dec. 9, 2016

(65) Prior Publication Data

US 2017/0167543 A1    Jun. 15, 2017

Related U.S. Application Data

(60) Provisional application No. 62/383,629, filed on Sep. 6, 2016, provisional application No. 62/266,353, filed
(Continued)

(51) Int. Cl.
*F16D 1/12* (2006.01)
*B60K 25/00* (2006.01)
(Continued)

(52) U.S. Cl.
CPC .............. *B60K 25/00* (2013.01); *F16D 1/033* (2013.01); *F16D 1/076* (2013.01); *F16D 1/12* (2013.01)

(58) Field of Classification Search
CPC . F16D 1/033; F16D 1/076; F16D 1/12; Y10T 403/64; Y10T 403/642; Y10T 403/645
See application file for complete search history.

(56) References Cited

U.S. PATENT DOCUMENTS 3,311,392 A * 3/1967 Buschow ................ F16L 23/12
   277/627
3,991,629 A * 11/1976 Dearnley ............... B60K 17/28
   74/15.4

(Continued)

FOREIGN PATENT DOCUMENTS

JP     2007170603    7/2007
JP     2011196522   10/2011

*Primary Examiner* — David R Morris
(74) *Attorney, Agent, or Firm* — Daniel L. Boots; Brian W. Chellgren; Bingham Greenbaum Doll LLP

(57) ABSTRACT

Systems and methods for mounting auxiliary devices, such as hydraulic pumps or electric generators, to a power takeoff (PTO) maintain alignment of the auxiliary device with the PTO while allowing hand rotation of the auxiliary device to an appropriate orientation and secure the auxiliary device to the PTO in the selected orientation. Embodiments include a stationary member that connects to a PTO and captures a rotatable member between the stationary member and the PTO. When the appropriate orientation of the auxiliary device is achieved, the rotatable member can be moved toward the auxiliary device to connect to the auxiliary device and to engage the stationary member (and to possibly engage teeth in the stationary member) to lock the orientation of the rotatable member.

13 Claims, 20 Drawing Sheets

Related U.S. Application Data on Dec. 11, 2015, provisional application No. 62/335,932, filed on May 13, 2016.

(51) Int. Cl.
*F16D 1/033* (2006.01)
*F16D 1/076* (2006.01)

(56) References Cited

U.S. PATENT DOCUMENTS

| | | | |
|---|---|---|---|
| 4,594,906 A * | 6/1986 | Vincent | B60K 17/28 192/17 R |
| 4,773,277 A | 9/1988 | Cook et al. | |
| 4,811,614 A | 3/1989 | Lasoen | |
| 6,830,142 B2 | 12/2004 | Weilant | |
| 6,854,541 B2 | 2/2005 | Matufuji et al. | |
| 6,868,925 B2 | 3/2005 | Trefz et al. | |
| 7,070,036 B2 | 7/2006 | Fernandez | |
| 2014/0165748 A1 | 6/2014 | Alford et al. | |
| 2014/0235403 A1 | 8/2014 | Gilbert et al. | |
| 2015/0013482 A1 | 1/2015 | Horsfall et al. | |
| 2015/0068824 A1 | 3/2015 | Matsuura et al. | |

* cited by examiner

ADJUSTABLE PTO MOUNTING DEVICES AND METHODS

This application claims the benefit of priority to U.S. Provisional Patent Application No. 62/266,353, filed Dec. 11, 2015, entitled SYSTEMS AND METHODS FOR MOUNTING COMPONENTS TO POWER TAKEOFFS, and U.S. Provisional Patent Application No. 62/383,629, filed Sep. 6, 2016, entitled ADJUSTABLE PTO MOUNTING DEVICES AND METHODS, the entirety of each is incorporated herein by reference. This application further claims the benefit of priority to U.S. Provisional Patent Application No. 62/335,932, filed May 13, 2016, entitled ADJUSTABLE PTO MOUNTING DEVICES AND METHODS.

FIELD

This disclosure relates to power takeoff (PTO) devices useful for mounting on transmissions for performing, directly or indirectly, useful work via the power takeoff selectively rotatable output shaft. More particularly, this disclosure relates to improved apparatuses and methods for mounting auxiliary equipment to a power takeoff.

BACKGROUND

The use of a PTO in association with an engine (e.g., an engine powering a vehicle, such as a truck, or a stationary engine, such as an engine powering a generator) is generally known. Such PTOs often include an input gear, an output gear connected to an output shaft, and a clutch mechanism for selectively engaging and disengaging the input gear and the output gear so as to selectively rotate the output shaft of the PTO to perform useful work, such as to power auxiliary equipment. Once connected to the engine, such as by connecting the PTO to a gear within the engine's transmission, the input gear of the PTO can draw mechanical power from the engine and selectively transfer this power to an auxiliary device mounted to the PTO.

PTO powered auxiliary equipment (e.g., a hydraulic pump or an electrical generator) or PTO components, such as a PTO cartridge valve (e.g., a electrohydraulic cartridge valve, and which may be commonly referred to as a solenoid or a solenoid valve) or valve body (which may control engagement/disengagement of a PTO clutch or other PTO functions, to a PTO) (auxiliary equipment and PTO components are collectively referred to as auxiliary equipment) are typically mounted to a PTO with bolts, creating a secure and rigid attachment between the auxiliary equipment and the PTO. This type of attachment is typically sufficiently secure to carry the torsional load transmitted to auxiliary equipment through the connection between the PTO and the auxiliary equipment, but these attachments do not provide a wide variety of orientations for attaching the auxiliary equipment to a PTO. Since different types and forms of auxiliary equipment can be mounted to a PTO, and since the PTO itself can be mounted to different transmissions with different configurations, difficulties can arise when parts of the engine, transmission, other auxiliary equipment, or components of the vehicle (such as the chassis or the frame) interfere with the positioning and location of the auxiliary equipment, making installation of the auxiliary equipment difficult or impossible. These issues can make designing a single PTO for installation on more than one type of transmission, engine, or vehicle difficult, if not impossible in some cases.

The arrangement of bolts (and holes to receive the bolts) for mounting auxiliary equipment to a PTO can be arranged in a pattern that permits attachment of the auxiliary equipment to the PTO in more than one rotational orientation; however, the limited number of orientations offered by these limited attachment arrangements frequently result in there being no acceptable orientation for the auxiliary equipment, i.e., there is interference between the auxiliary equipment and other components in each of the limited number of possible orientations. For example, three bolt mounting systems exist that allow installation of a component, such as a cartridge valve, which is typically enclosed in a valve body, in one of three orientations. To adjust the cartridge valve after being attached to the PTO, a user must remove all of the bolts holding the cartridge valve (typically held within a valve body with the bolts directly holding the valve body to the PTO) to the PTO, rotate the cartridge valve to the newly desired orientation, and reinsert and tighten the bolts to hold the cartridge valve in its new orientation. In certain combinations of engines, transmissions and vehicles to which the PTO is being connected, none of the three orientations may be suitable.

Although attempts have been made to increase the number of orientations by increasing the number of holes for mounting the auxiliary equipment to the PTO, the maximum number of orientations is fairly low because the increased number of bolt holes results in decreased structural integrity in the PTO and extended installation and the increased removal times required to install or remove the increased number of bolts (fasteners). For at least these reasons, difficulties still exist when attaching auxiliary equipment to PTOs using known methods and techniques.

It was realized by the inventor of the present disclosure that improvements in apparatuses and methods for mounting auxiliary equipment to PTOs are needed. Certain preferred features of the present disclosure address these and provide other important advantages.

SUMMARY

Embodiments of the present disclosure provide improved adjustable PTO mounting devices and methods.

Embodiments of the present disclosure provide mounting devices and methods that allow a user to mount one piece of machinery to another piece of machinery (such as mounting two housings to one another, e.g., a transmission housing and a PTO housing, each housing having rotating machinery inside) in any of a large number (infinite in some embodiments) orientations.

Example embodiments of the present disclosure provide an adjustable PTO mounting device that allows a user to attach auxiliary equipment to a PTO in any of a large number of orientations. By providing the user with a large number of orientations, the user may select the most appropriate orientation in which to attach a particular auxiliary device to the PTO. These embodiments have particular advantages when installing PTOs on transmissions or engines in which there is little available space for installing a PTO, and in situations where traditional mounting methods do not offer an orientation free from interference with other portions of the engine, engine housing, transmission, or vehicle. In some embodiments, the number of orientations in which the auxiliary device may be attached to the PTO exceeds the number of fasteners, typically bolts, holding the auxiliary device to the PTO. In some embodiments, the number of orientations in which the auxiliary device may be attached to the PTO is infinite.

In at least one embodiment (e.g., see FIGS. 1-8), the user is able to rotate a portion (which may be referred to as a rotatable portion, or a rotatable member) of the mounting device that connects to the auxiliary device while another portion (which may be referred to as a stationary portion, or a stationary member) of the mounting device that connects to the PTO housing is attached to the PTO. The rotatable and stationary portions may be configured to allow rotation of the rotatable portion with respect to the stationary portion when the rotatable portion and the stationary portion are in a first orientation (or position) with respect to one another. After achieving the desired orientation, the user may lock the orientation of the rotatable member by positioning the rotatable and stationary members in a second orientation (or position) with respect to one another. In some embodiments, the rotating member is retained by the stationary member and the PTO (e.g., captured between the stationary and the PTO member) when the stationary member and the PTO are connected to one another.

In some embodiments (e.g., see FIGS. 9-11 and 12-13), a band-like clamp is used to secure the rotatable member to which the auxiliary device is attached to the PTO in any one of an infinite number of possible rotational orientations.

In some embodiments, the user is able to select the final orientation of the auxiliary device from a finite number of possible orientations. For example, in at least one embodiment the user is able to select an orientation from at least ten (10) possible orientations. In other embodiments, the user is able to select an orientation from at least fifty (50) possible orientations. And, in some embodiments the user is able to select an orientation from at least one hundred (100) possible orientations.

In some embodiments (e.g., see FIGS. 14-18 and 19-20), the user is able to rotate an auxiliary device or component (which may be referred to as a rotatable member) that connects to the PTO housing while a clamping member (which may be referred to as a stationary member) that connects to the PTO housing is attached to the PTO. The rotatable and stationary portions may be configured to allow rotation of the rotatable portion with respect to the stationary portion and with respect to the PTO when the stationary portion is attached to the PTO via at least one untightened fastener. After achieving the desired orientation, the user may lock the orientation of the rotatable member by tightening the at least one fastener. In some embodiments, the rotating member is retained by the stationary member and the PTO (e.g., captured between the stationary member and the PTO) when the stationary member and the PTO are connected to one another via at least one fastener.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

DETAILED DESCRIPTION OF THE ILLUSTRATED EMBODIMENTS

Figure 1:
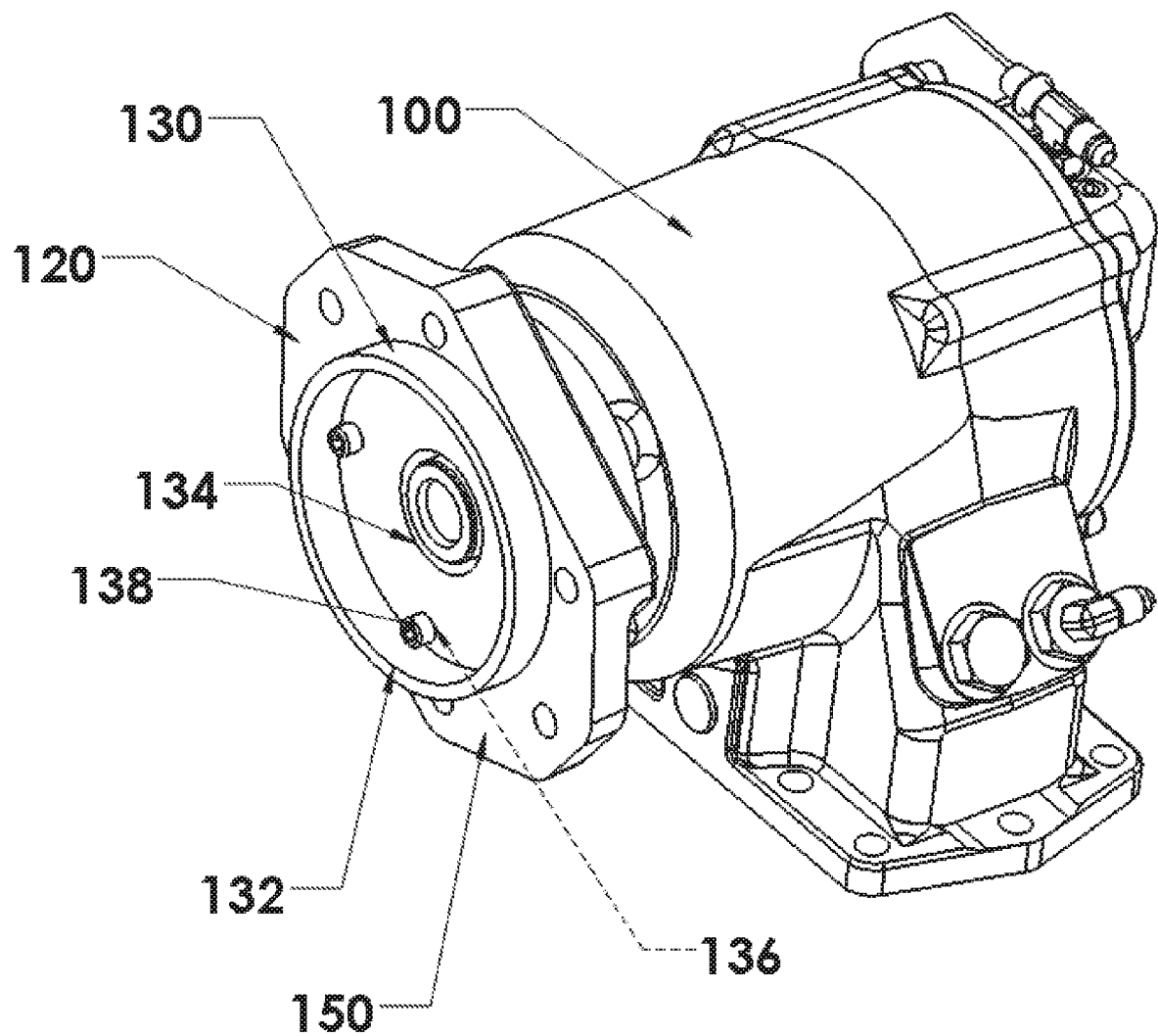
FIG. 1 is a perspective view of an adjustable PTO mounting device in the rotationally disengaged orientation according to one embodiment of the present disclosure.
Figure 2:
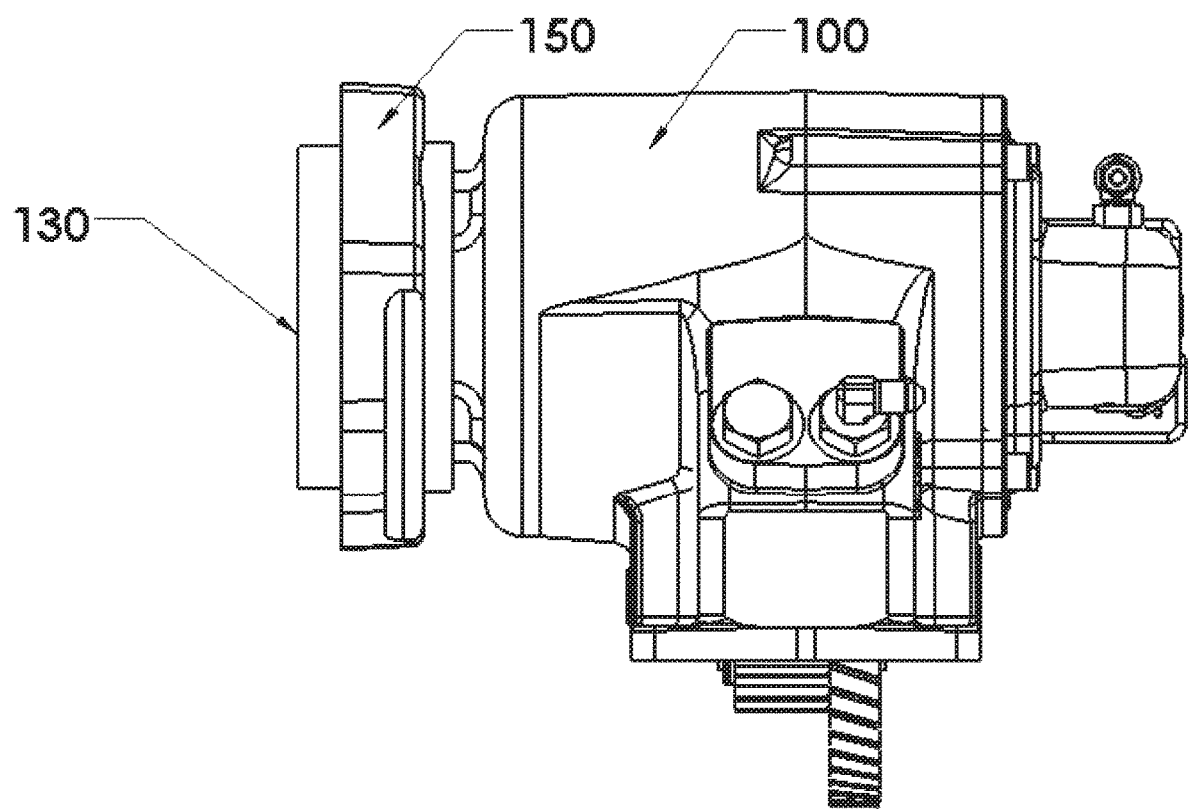
FIG. 2 is a side view of the adjustable PTO mounting device depicted in FIG. 1.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Figure 3:
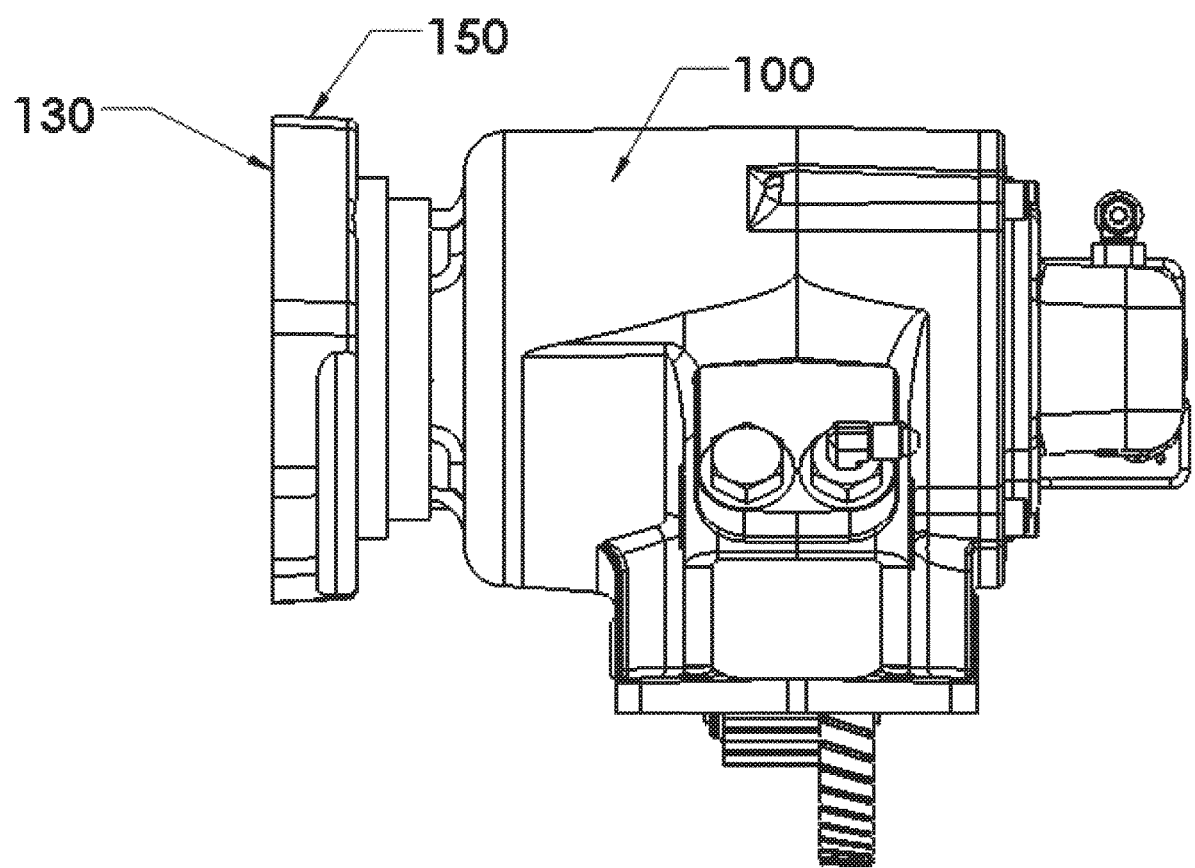
FIG. 3 is a side view of the adjustable PTO mounting device depicted in FIG. 1 in the rotationally engaged orientation.
Figure 4:
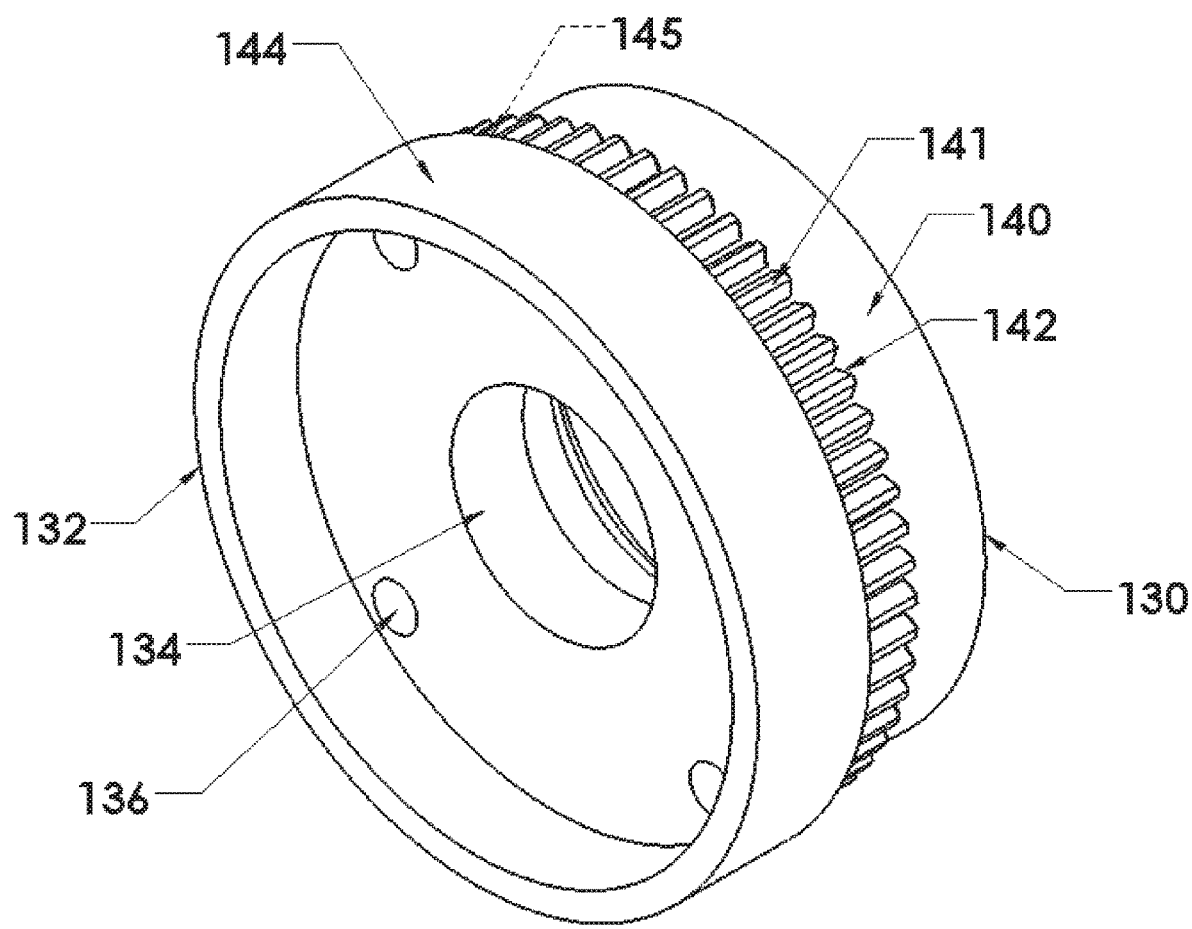
FIG. 4 is a perspective view of the stationary portion of the adjustable PTO mounting device depicted in FIG. 1.

Depicted in FIGS. 1-8 is an adjustable PTO mounting device 120 according to one embodiment of the present disclosure. Adjustable mounting device 120 includes a stationary member 130 and a rotatable member 150. As can be seen in FIG. 4, stationary member 130 includes a disengagement portion 140, an engagement portion 141, and a retainer portion 144. Engagement portion 141 includes one or more surface features where the surface is not smooth, such as one or more teeth or one or more splines 142. Retainer portion 144 includes a retaining surface 145.

Stationary member 130 is configured to connect to the PTO 100 and to be rotationally coupled to the PTO 100. In the depicted embodiment, stationary member 130 includes mounting features (e.g., apertures 136) for securing stationary member 130 to PTO 100. In embodiments utilizing apertures 136, bolts 138 or other fasteners may be inserted to attach stationary member 130 to PTO 100. In embodiments where the adjustable mounting device 120 is configured to attach an auxiliary device to a PTO output shaft, such as the embodiment depicted in FIGS. 1-8, stationary member 130 includes an aperture 134 to accommodate the PTO output shaft and/or the input shaft of the auxiliary device.

Figure 5:
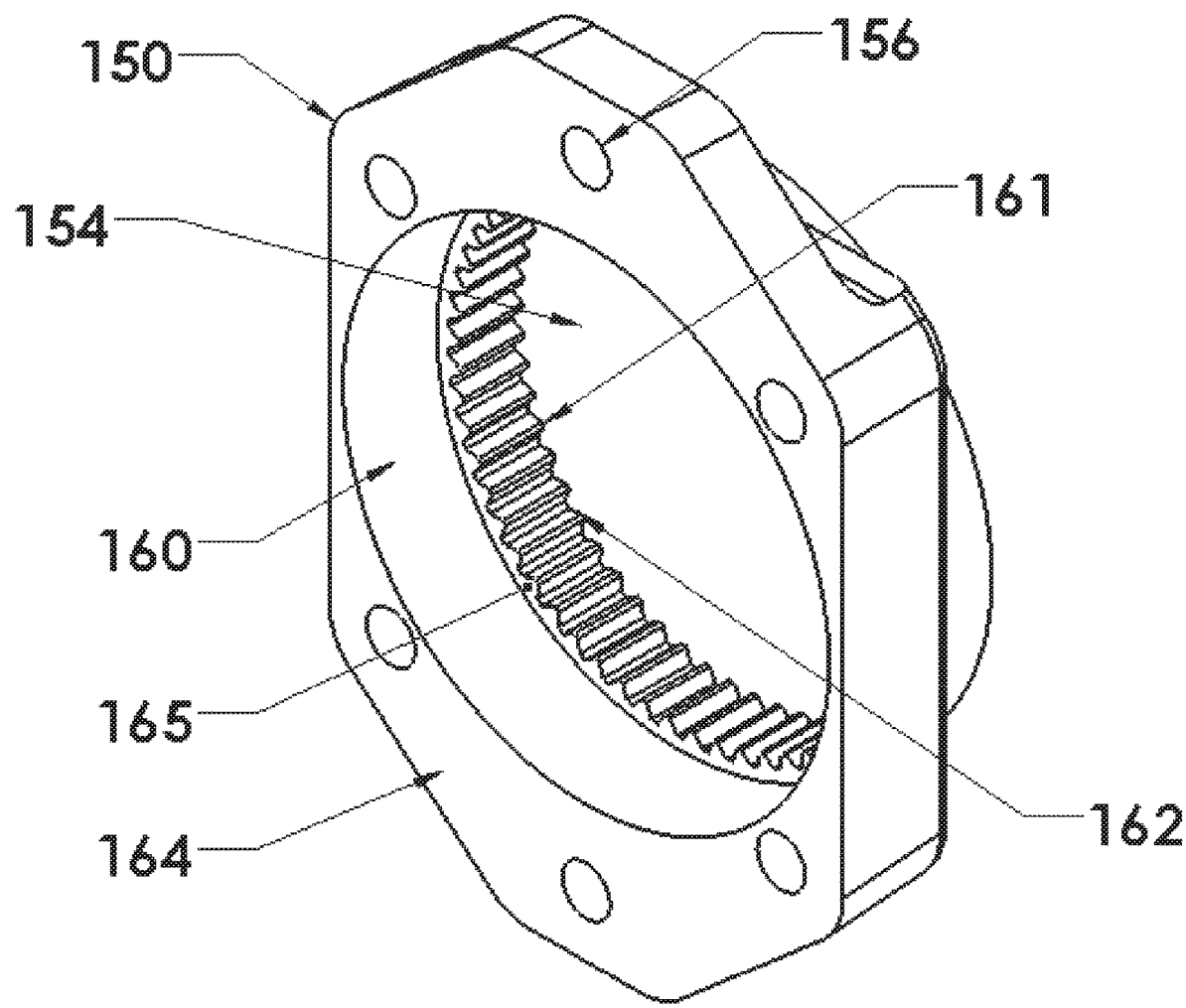
FIG. 5 is a perspective view of the rotatable portion of the adjustable PTO mounting device depicted in FIG. 1.

Referring to FIG. 5, rotatable member 150 includes a disengagement portion 160, an engagement portion 161, and a retainer portion 164. Engagement portion 161 includes one or more surface features where the surface is not smooth, such as one or more teeth or one or more splines 162. Retainer portion 164 includes a retaining surface 165. Rotatable member 150 is configured to connect to the auxiliary device being connected to the PTO (e.g., a hydraulic pump or an electrical generator, which can be used to power auxiliary equipment such as dump beds, spreaders, sprayers, snow plows, etc.), and to be rotationally coupled to the auxiliary device.

In the depicted embodiment, rotatable member 150 includes mounting features (e.g., apertures 156) for securing rotatable member 150 to the auxiliary device. In embodiments utilizing apertures 156, bolts 138 may be inserted through apertures 156 to attach rotatable member 150 to the auxiliary device. In embodiments where the adjustable mounting device 120 is configured to attach an auxiliary device to a PTO output shaft, such as the embodiment depicted in FIGS. 1-8, rotatable member 150 includes an aperture 154 to accommodate the PTO output shaft and/or the input shaft of the auxiliary device.

Figure 6:
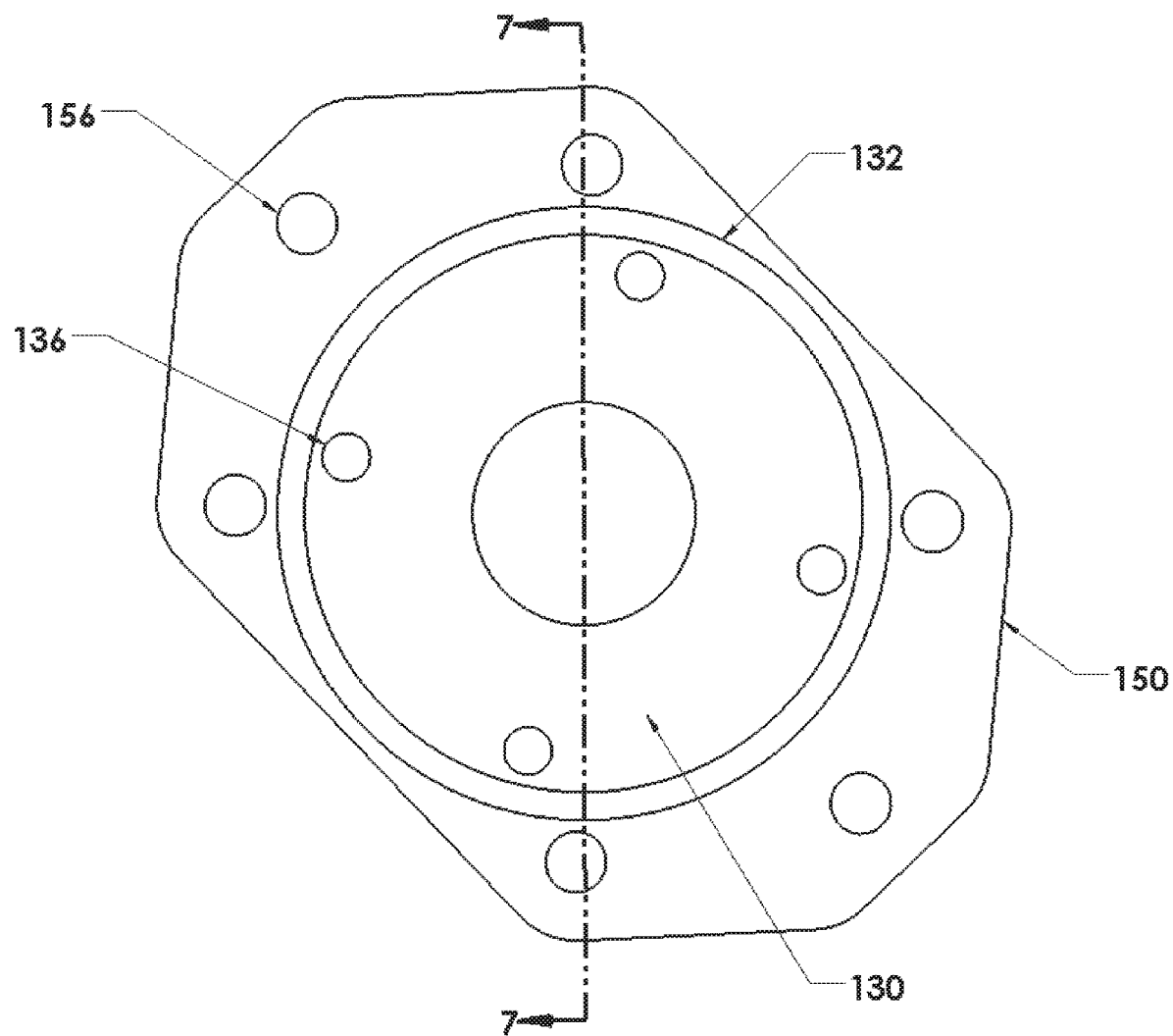
FIG. 6 is an end view of the stationary and rotatable portions of the adjustable PTO mounting device depicted in FIG. 1 in the rotationally engaged orientation.
Figure 7:
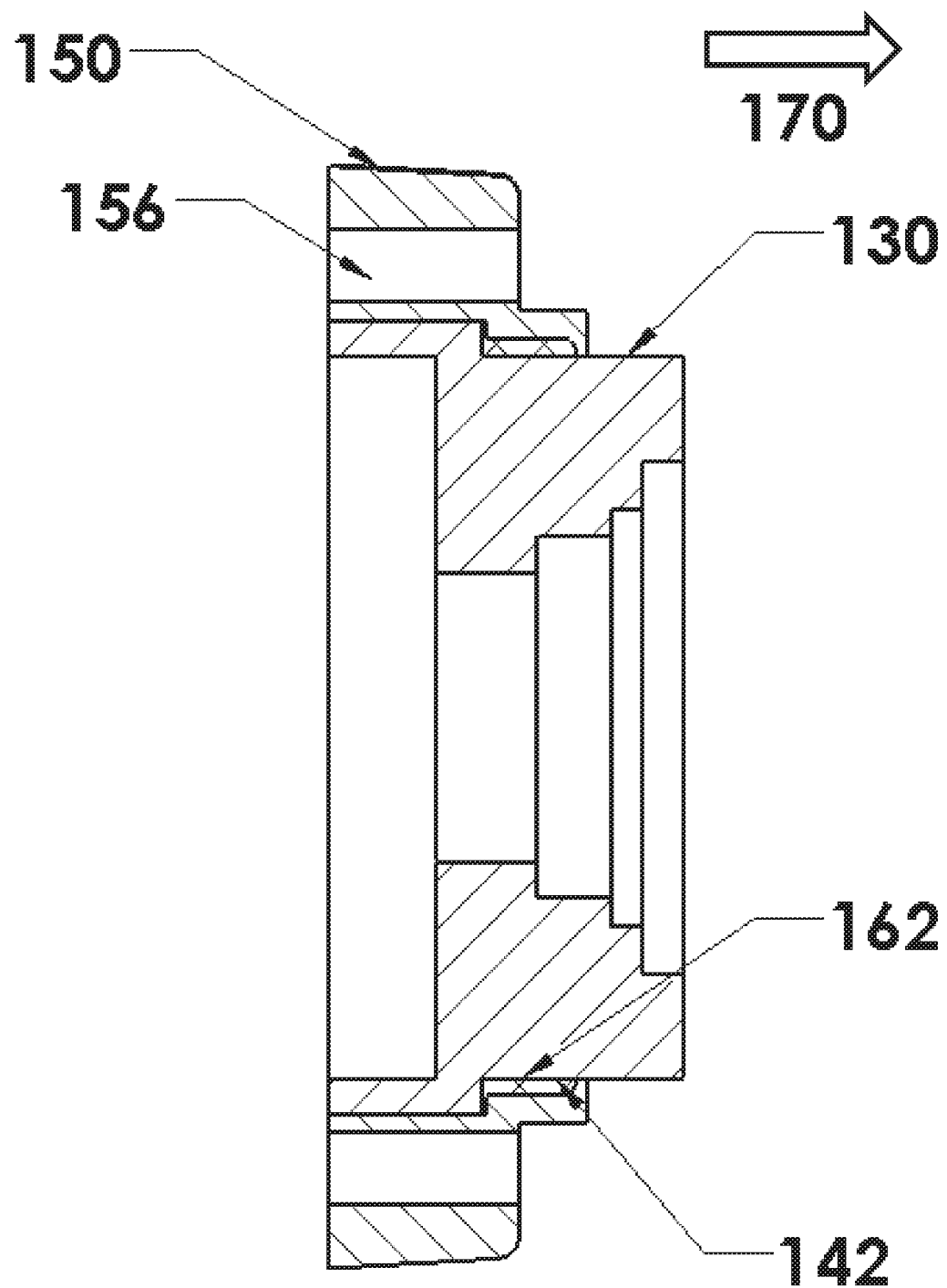
FIG. 7 is a sectional view of the stationary and rotatable portions depicted in FIG. 6 taken along line 7-7.

When stationary member 130 and rotatable member 150 are in the rotationally engaged position (which may also be referred to as a "locked" orientation, see, e.g., FIGS. 3, 6, and 7), splines 142 intermesh with and are in a cooperative interlocking relationship with splines 162 to inhibit rotation of rotatable member 150 with respect to stationary member 130. When rotatable member 150 is moved into a rotationally disengaged position with stationary member 130 (which may also be referred to as an "unlocked" orientation, such as by moving rotatable member 150 in linear disengagement direction 170—see, e.g., FIGS. 1, 2 and 8), splines 162 disengage with splines 142 and align with disengagement portion 140 of stationary member 130. When splines 162 of rotatable member 150 are aligned with disengagement portion 140 of stationary member 130, splines 142 of stationary member 130 are aligned with disengagement portion 160 of rotatable member 150. As such, splines 142 and 162 are aligned with smooth surfaces (the smooth surfaces of disengagement portions 160 and 140, respectively), and rotation of rotatable member 150 with respect to stationary member 130 is facilitated.

Figure 8:
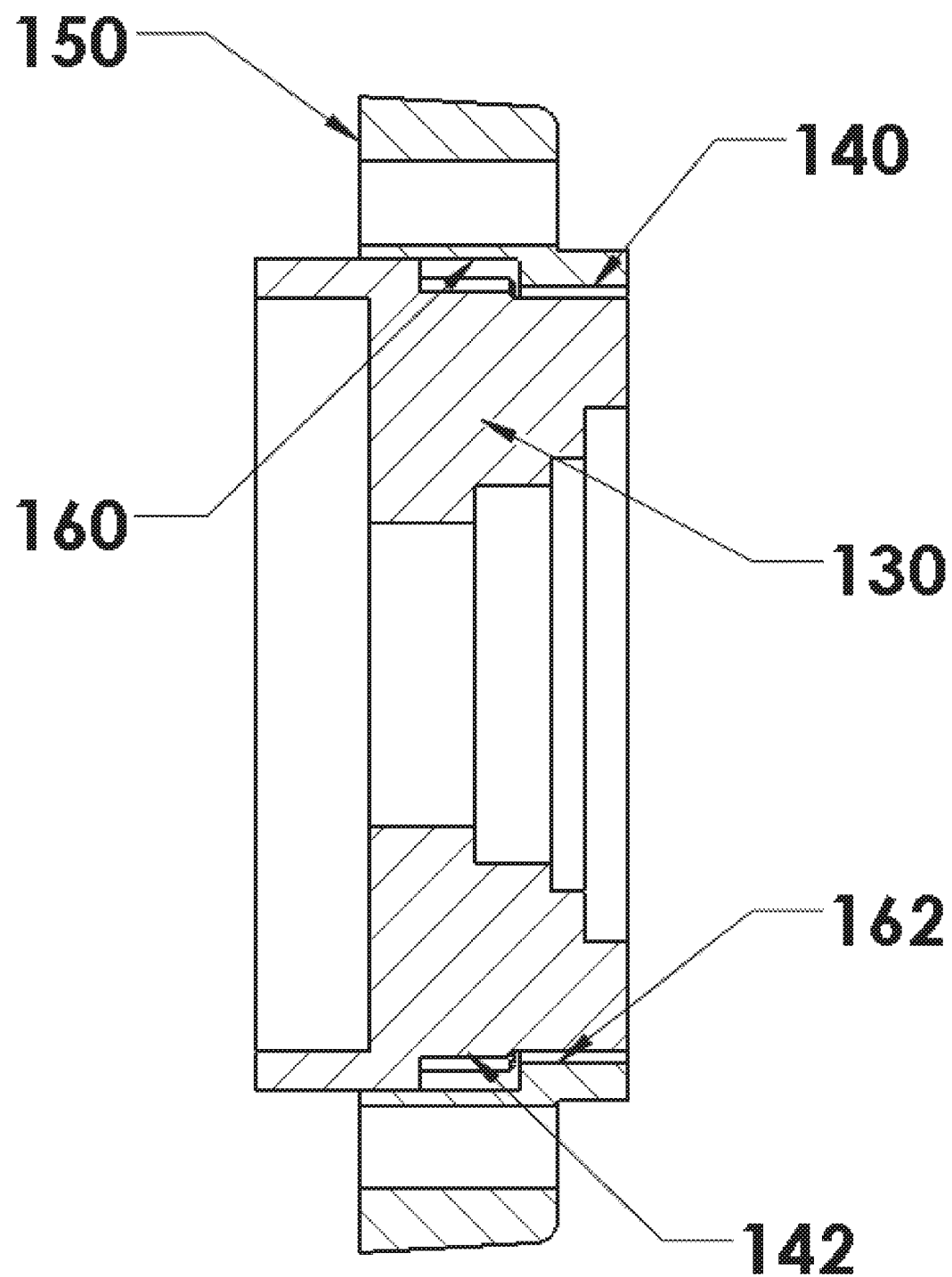
FIG. 8 is a sectional view of the stationary and rotatable portions of the adjustable PTO mounting device depicted in FIG. 7 in the rotationally disengaged orientation.

When using the embodiment depicted in FIGS. 1-8, a user typically inserts the disengagement portion 140 of stationary member 130 into aperture 154 of rotatable member 150 to produce an arrangement similar to those depicted in FIGS. 6-8. In some embodiments, such as that depicted in FIG. 7, the rotatable member 150 surrounds the stationary member 130. The user may then attach stationary member 130 to PTO 100, such as by inserting bolts 138 through mounting apertures 136 and securing bolts 138 to PTO 100. Once mounted to PTO 100, stationary member 130 is rotationally engaged with (i.e., does not rotate with respect to) PTO 100.

Once stationary member 130 has been mounted to PTO 100, rotatable member 150 is captured and held between stationary member 130 and PTO 100. A user will be unable to remove rotatable member 150 without first removing stationary member 130 from PTO 100. If a user attempts to move rotatable member 150 past stationary member 130, retaining surface 165 will abut retaining surface 145 and prevent rotational member 150 from moving past stationary member 130.

Stationary member 130 may include a pilot 132 (see FIG. 4), which may assist the user in guiding the auxiliary device into alignment with mounting device 120 and rotatable member 150. In some embodiments, the pilot 132 is configured to allow rotation of the auxiliary device while engaged with pilot 132 to assist the user in maintaining alignment with mounting device 120 (and PTO 100) and rotatable member 150 while finding the appropriate orientation for the auxiliary device.

In embodiments utilizing pilot 132, the user can align the auxiliary device being attached to the PTO with mounting device 120 by engaging a portion of the auxiliary device with pilot 132. For example, some auxiliary devices can have a circular member sized to receive (or be received by) pilot 132 and allow the auxiliary device and pilot 130 rotate in relation to one another by hand. Once the auxiliary device is engaged with pilot 132, the user may rotate the auxiliary device until reaching an appropriate rotational orientation, after which the user may rotate rotatable member 150 to align the mounting features (e.g., apertures 156) in rotatable member 150 with the corresponding coupling features in the auxiliary device (frequently bolt holes), then move rotatable member 150 toward the auxiliary device, thereby moving rotatable member 150 into an engaged orientation with stationary member 130 (e.g., away from PTO 100). Small rotational adjustments in rotatable member 150 and/or the auxiliary device may be required to align and engage splines 142 and 162. Once rotatable member 150 and stationary member 130 are in the engaged (e.g., locked) orientation, rotational member 150 and stationary member 130 are rotationally coupled to one another and splines 142 and 162 inhibit rotation of rotatable member 150 and stationary member 130 with respect to one another, securely mounting and rotationally connecting the auxiliary device to PTO 100 in the user's desired orientation.

In some embodiments, stationary member 130 and rotational member 150 are configured such that the uncoupling of stationary member 130 and rotatable member 150, the rotating of rotatable member 150 when stationary member 130 and rotatable member 150 are in an uncoupled position, and the re-coupling of stationary member 130 and rotatable member may be accomplished by hand (e.g., without the need for powered tools).

When stationary member 130 and rotatable member 150 are in a rotationally engaged position with respect to one another (see, e.g., FIGS. 3, 6, and 7), rotatable member 150 is rotationally engaged with stationary member 130, which is rotationally engaged with PTO 100. In this rotationally engaged orientation, splines 142 and 162 carry the rotational loads (torque) imparted to the auxiliary device and hold the auxiliary device in the appropriate orientation during operation. However, when the user moves rotatable member 150 to a rotationally disengaged position (such as by loosening or removing the bolts attaching rotatable member 150 to the auxiliary device and moving rotatable member 150 toward PTO 100 in disengagement direction 170—see FIG. 7), rotatable member 150 and stationary member 130 will become rotationally disengaged allowing the user to freely rotate (for example, by hand) rotatable member 150 with respect to stationary member 130 and PTO 100. The rotationally disengaged orientation of stationary member 130 and rotatable member 150 can be seen in FIGS. 1, 2 and 8.

Although the embodiments shown in FIGS. 1-8 depict the rotatable member surrounding the stationary member, other embodiment include the stationary member surrounding the rotatable member. Moreover, while the rotatable member has been generally described as attaching to the auxiliary device and the stationary member has been generally described as attaching to the PTO, some embodiments include a rotatable member that attaches to the PTO and a stationary member that attaches to the auxiliary device.

Although "stationary" and "rotatable" are relative terms, these terms are used here for descriptive purposes to assist in the understanding of the various apparatuses and methods described herein. When connected to the PTO, the stationary portion/member may appear generally stationary to the user when compared to the rotatable portion/member. Other terms that may be used to describe these members include referring to the "stationary" portion/member as the "PTO attachment" portion/member and referring to the "rotatable" member as the "auxiliary device attachment" portion/member. It should also be appreciated that in some embodiments, the stationary portion/member may be connected to the auxiliary device and the rotatable portion/member may be connected to the PTO.

Figure 9:
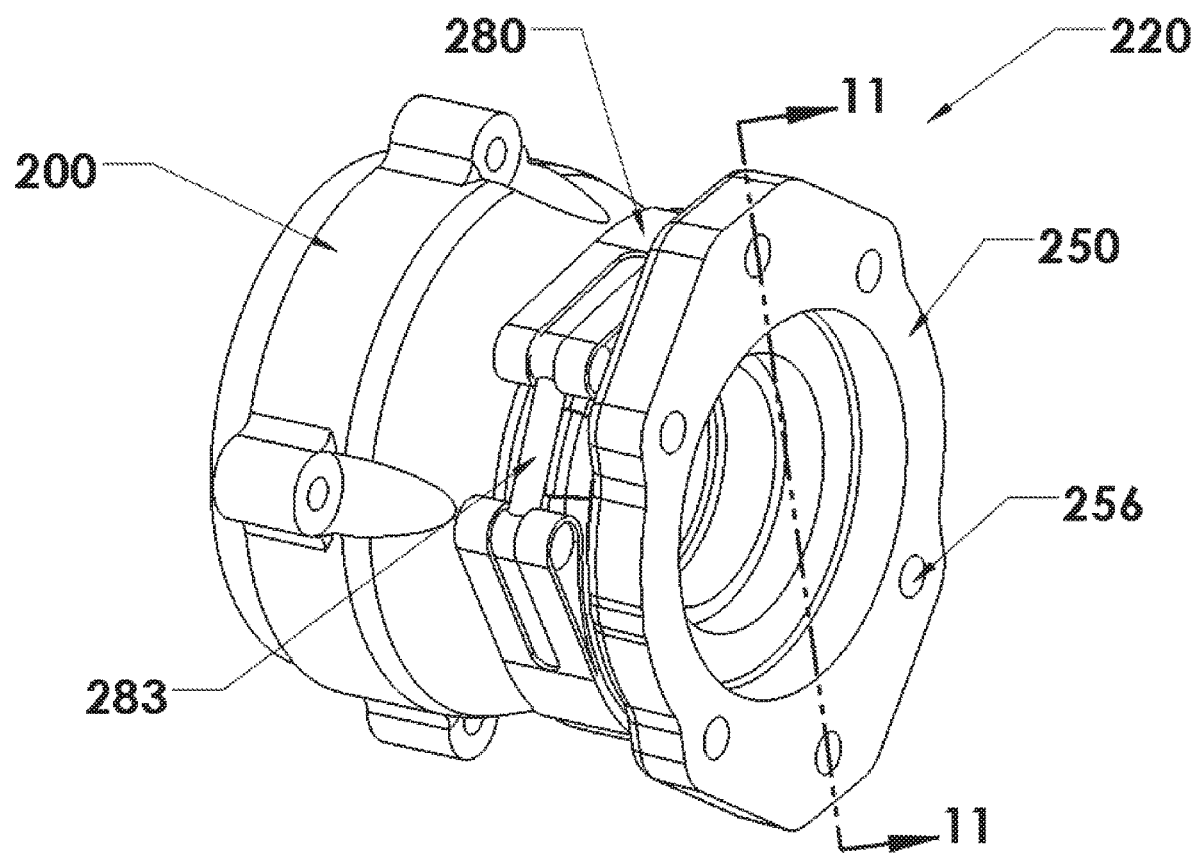
FIG. 9 is a perspective view of an adjustable PTO mounting device according to another embodiment of the present disclosure.
Figure 10:
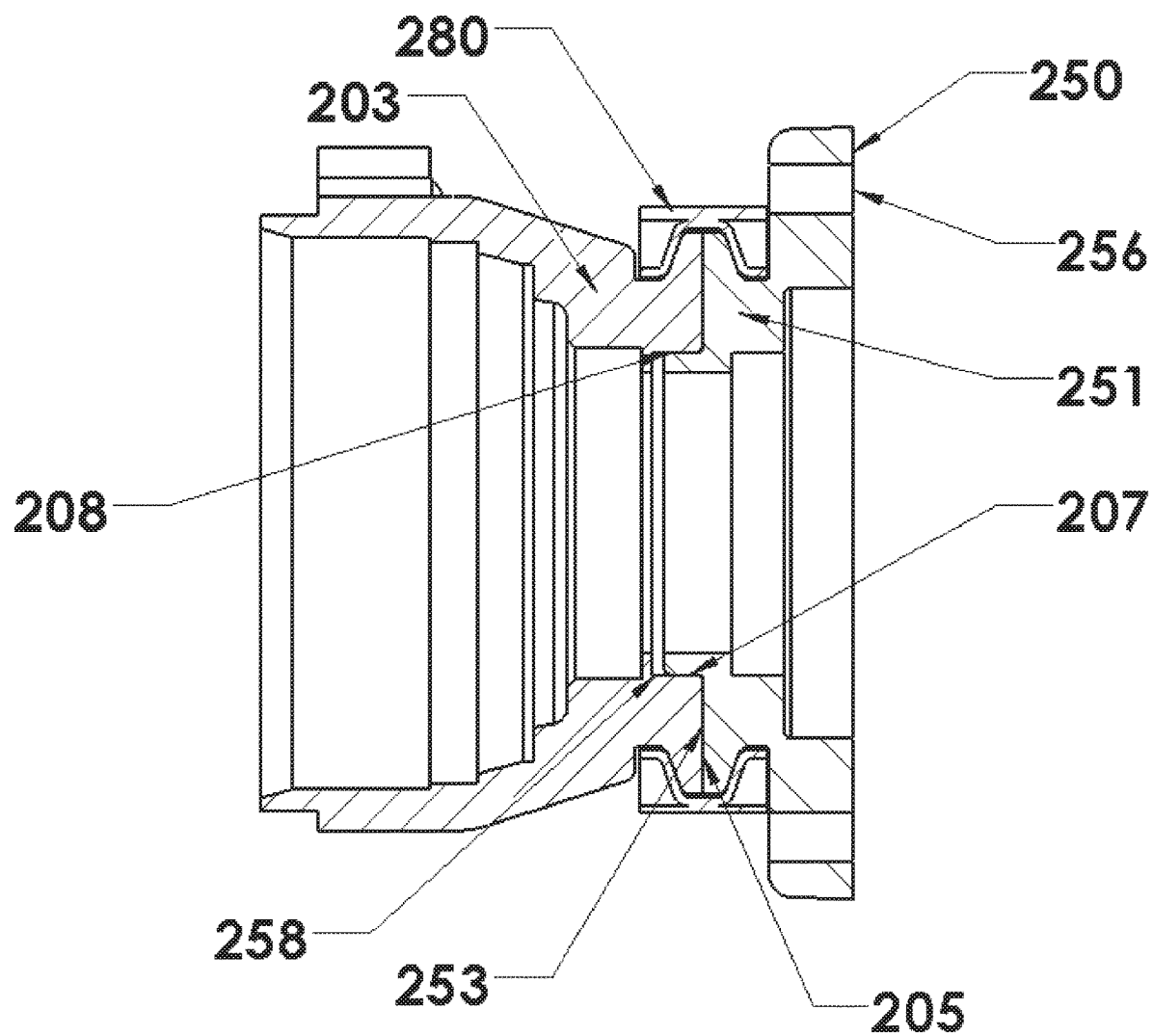
FIG. 10 is a sectional view of the adjustable PTO mounting device depicted in FIG. 9.
Figure 11:
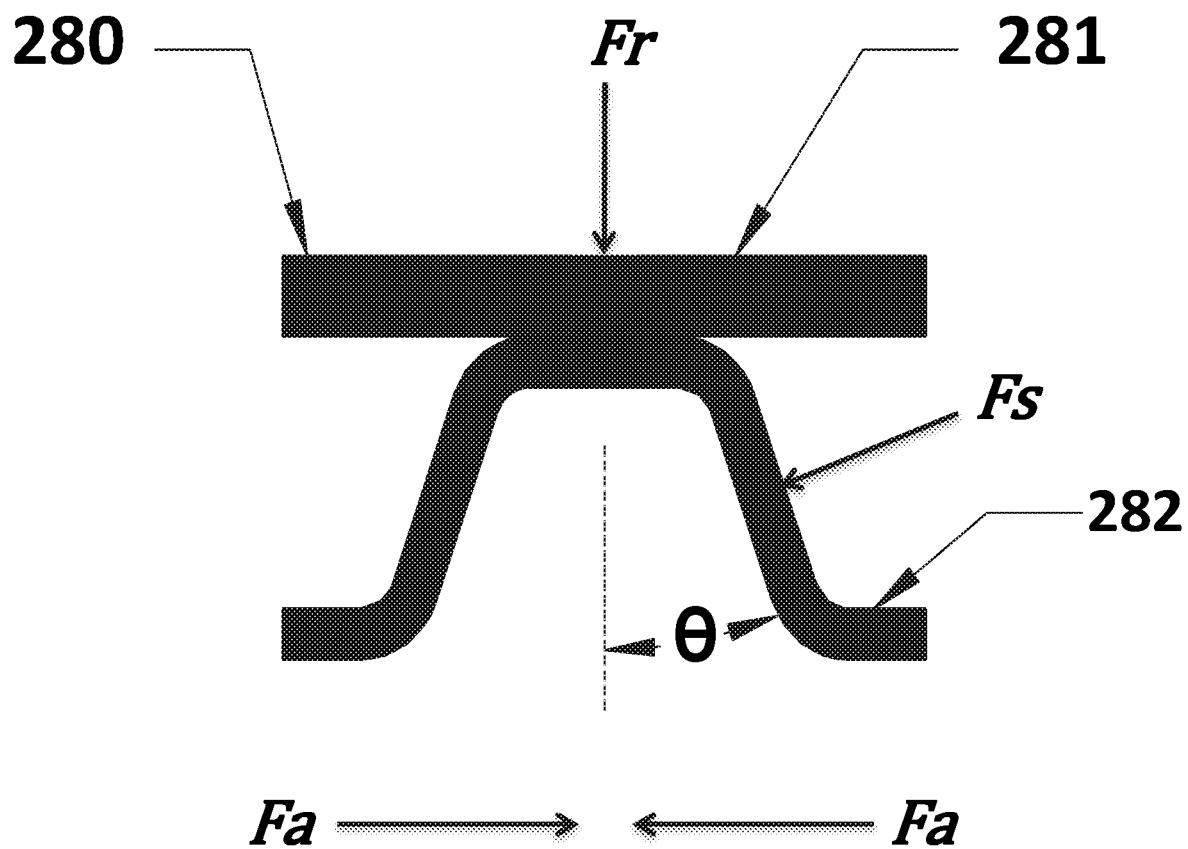
FIG. 11 is a schematic sectional view of the band clamp depicted in FIG. 10.

Depicted in FIGS. 9-11 is an adjustable PTO mounting device 220 according to another embodiment of the present disclosure. Adjustable mounting device 220 includes a rotatable member 250 and a clamp 280, which may take the form of a band clamp and which may be referred to as a stationary member. In the depicted embodiment, adjustable mounting device 250 can be used to mount auxiliary equipment to PTO 200 in one of an infinite number of rotational orientations.

Turning to FIG. 10, PTO 200 includes a mounting portion 203 with a mounting surface 205. Rotatable member 250 includes a PTO mounting portion 251 with a mounting surface 253 for mounting rotatable member 250 to PTO 200. Rotatable member 250 also includes mounting apertures 256 for mounting an auxiliary device to rotatable member 250.

Referring to FIGS. 9-11, clamp 280 includes an outer portion 281, an inner portion 282, and a tensioning member 283.

In use, rotatable member 250 can be positioned adjacent PTO 200 such that PTO mounting portion 251 and mounting portion 203 are adjacent one another. Some embodiments include a pilot that is received in an aperture to assist alignment. For example, in the illustrated embodiment, rotatable member 250 includes a pilot 258 that is received in aperture 207 of PTO 200 to assist in aligning rotatable member 250 with PTO 200. In other embodiments, the rotatable member includes the aperture and the PTO includes the pilot. In some embodiments, a slip fit is used between the pilot and the aperture so that the pilot may be inserted into the aperture by hand, and rotatable member 250 may be rotated with respect to PTO 200 by hand (e.g., without the need for powered tools) while the pilot is received within the aperture.

Clamp 280 may then be installed surrounding PTO mounting portion 251 and mounting portion 203. Once clamp 280 is mounted to PTO mounting portion 251 and mounting portion 203, tensioning member 283 may be adjusted (e.g., left loose) to allow hand rotation of rotatable member 250 with respect to PTO 200. Either before or after attaching an auxiliary device to rotatable member 250 (using, for example, mounting apertures 256), rotatable member 250 may be rotated to the appropriate orientation for installation of the auxiliary device. Once the appropriate orientation of rotatable member 250 is achieved, tensioning member 283 can be tightened to secure the rotational orientation between rotatable member 250 and PTO 200.

When tensioning member 283 is tightened, outer portion 281 applies a radial force ($F_r$) to inner portion 282 as best seen in FIG. 11. $F_r$ assists in keeping rotatable member 250 and PTO 200 centered and aligned with respect to one another. Due to the interior dimensions of inner portion 282 being smaller than the combined exterior dimensions of PTO mounting portion 251 and mounting portion 203, a force $F_s$ is applied to PTO mounting portion 251 and mounting portion 203. The axial portion of force $F_s$ (denoted as $F_a$ in FIG. 11) presses mounting surface 253 and mounting surface 205 together and assists in inhibiting rotation of rotatable member 250 with respect to PTO 200. In some embodiments, $F_r$ is less than $F_a$.

The friction between mounting surface 253 and mounting surface 205 inhibits rotation of rotatable member 250 with respect to PTO 200. Adjustable mounting device 220 secures rotatable member 250 to PTO 200 with sufficient force to resist the operational torque loads applied to rotatable member 250 by the auxiliary device. In some embodiments, adjustable mounting device 220 can hold rotatable member 250 in a desired rotational orientation without slippage while rotatable member 250 receives up to 600 ft./lbs. of torque. In other embodiments, adjustable mounting device 220 can hold rotatable member 250 in a desired rotational orientation without slippage while rotatable member 250 receives up to other amounts of torque.

In some embodiments, mounting surface 205 and/or mounting surface 253 can include one or more grooves for inserting an O-ring to seal against fluid leakage. In some embodiments, which may include embodiments with O-ring grooves in mounting surfaces 205 and/or 253, the pilot (e.g., pilot 258) and/or the aperture for the pilot (e.g., aperture 207) may include one or more grooves for receiving the O-ring to seal against fluid leakage. For example, either pilot surface 259 and/or aperture surface 208 may include a groove for receiving a seal (e.g., an O-ring).

Figure 12:
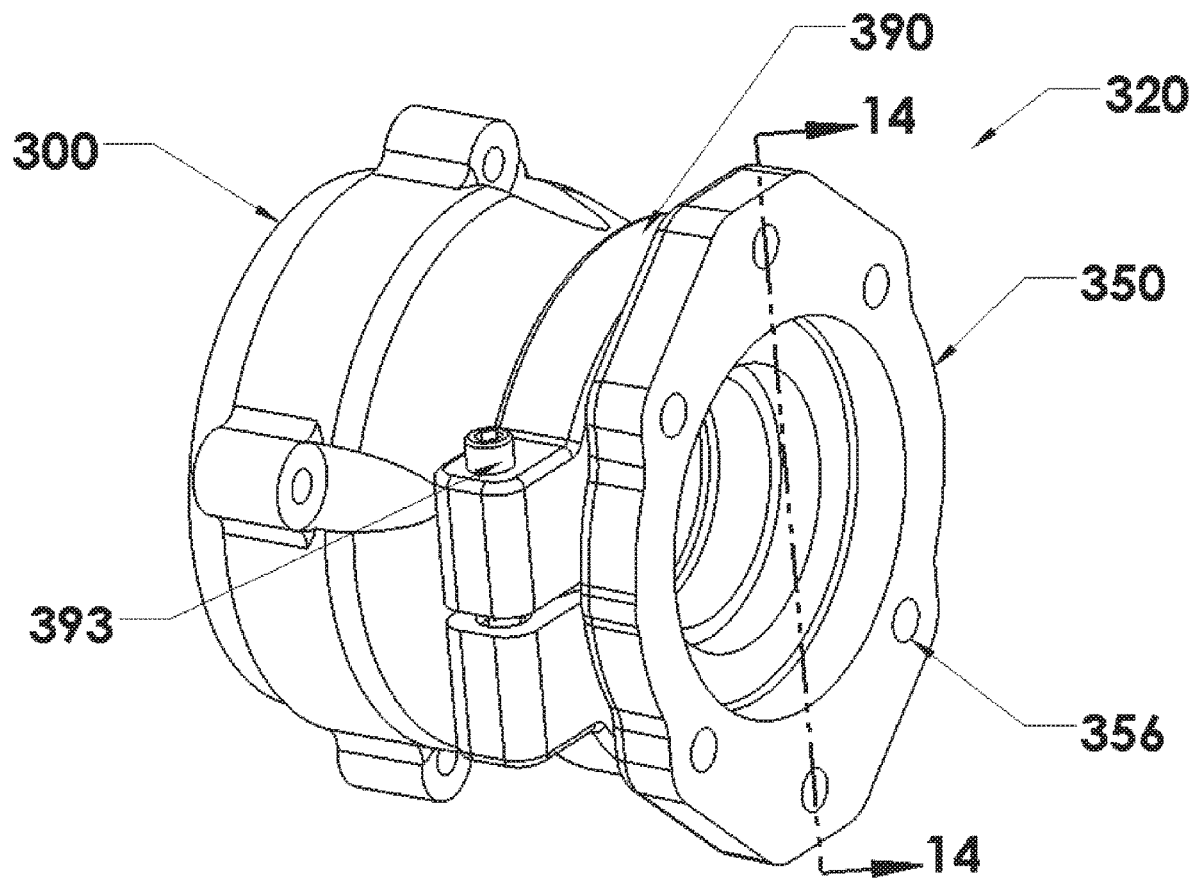
FIG. 12 is a perspective view of an adjustable PTO mounting device according to yet another embodiment of the present disclosure.
Figure 13:
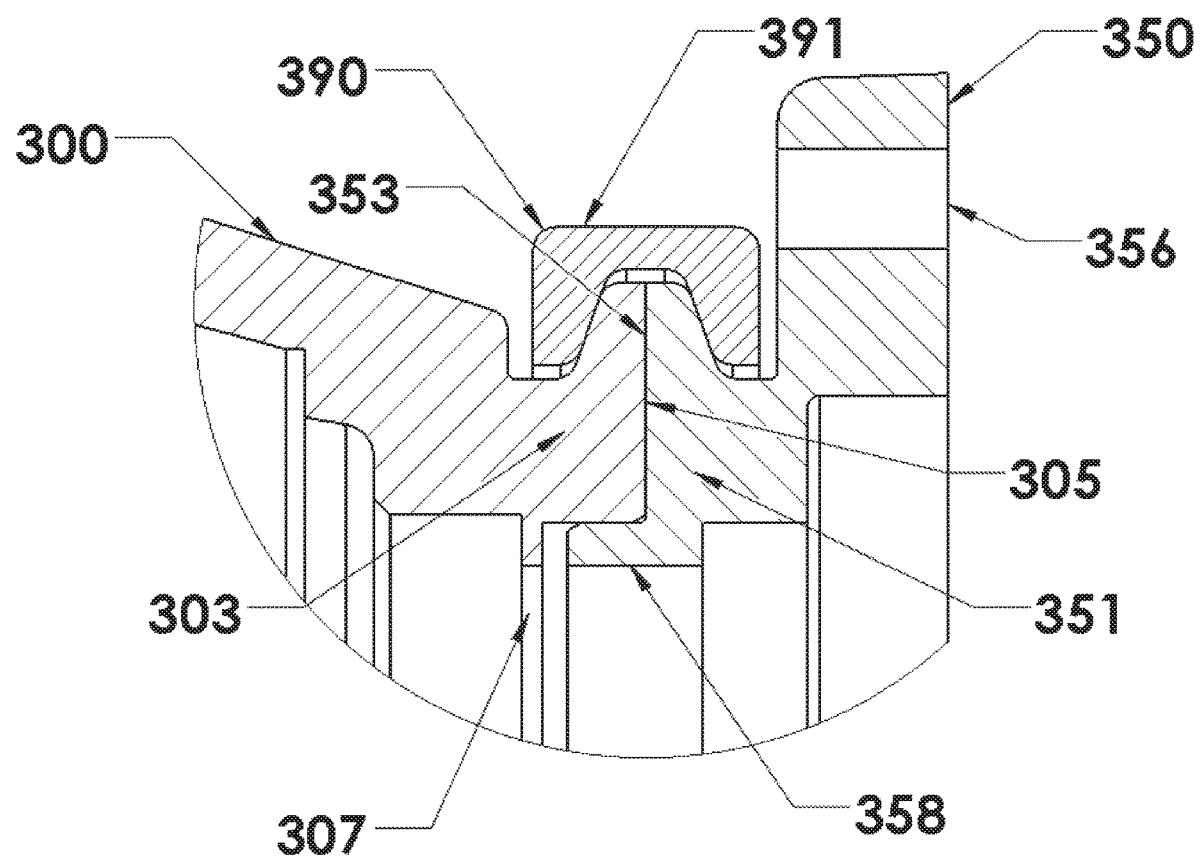
FIG. 13 is a sectional view of the adjustable PTO mounting device depicted in FIG. 12.
Figure 14:
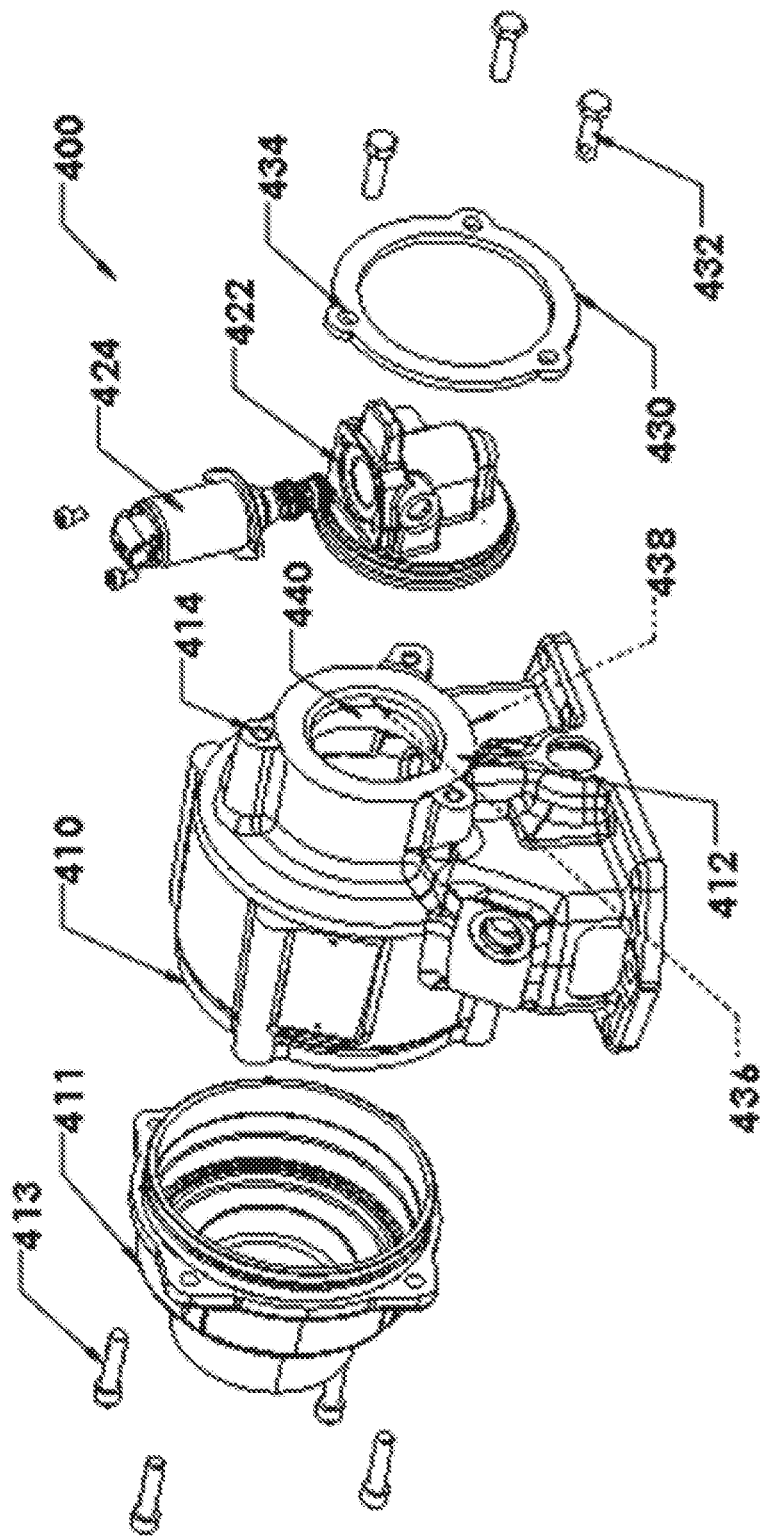
FIG. 14 is an exploded perspective view of a PTO and a PTO mounting assembly according to one embodiment of the present disclosure.
Figure 15:
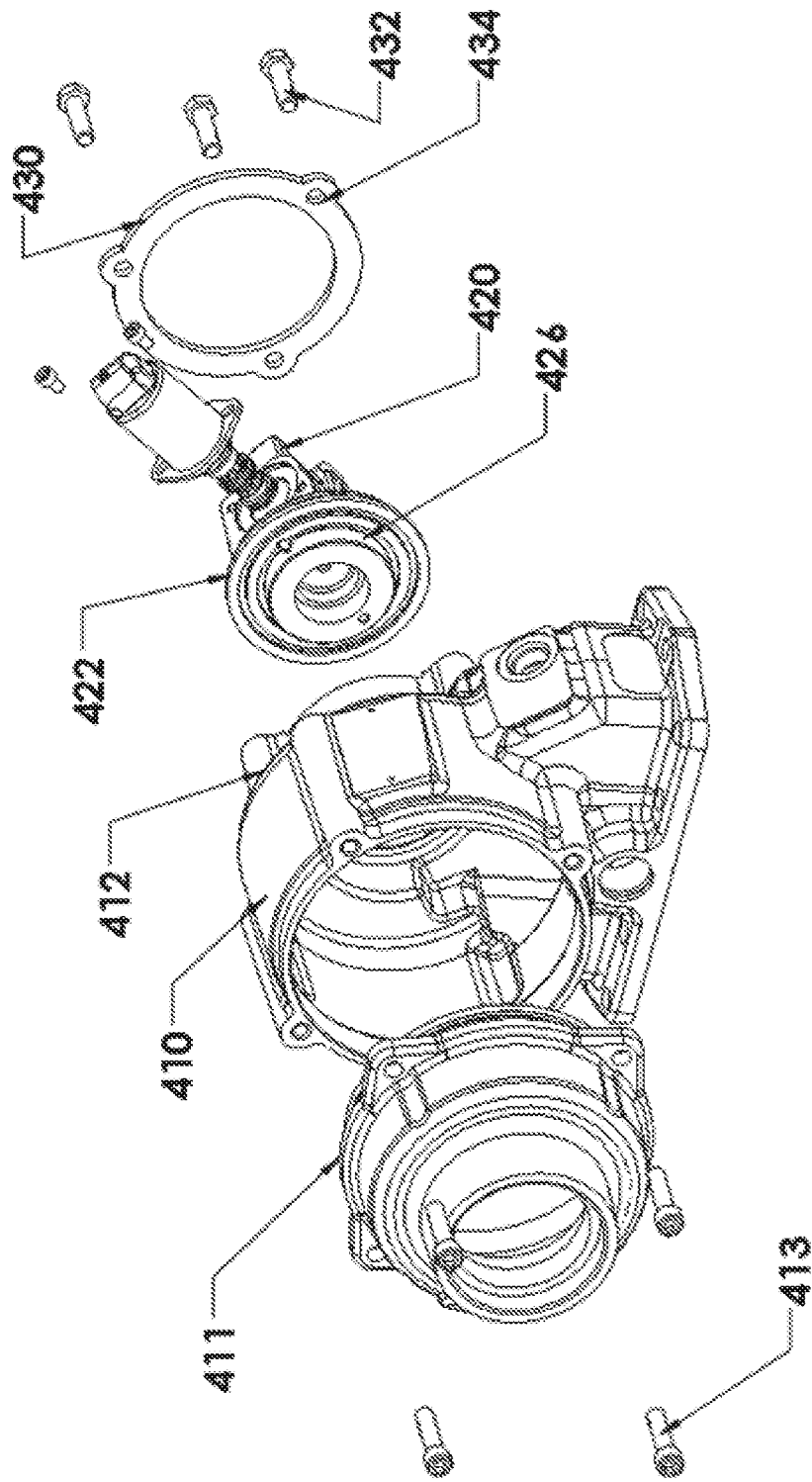
FIG. 15 is an exploded perspective view of the PTO and the PTO mounting assembly of FIG. 14 from an alternate perspective.
Figure 16:
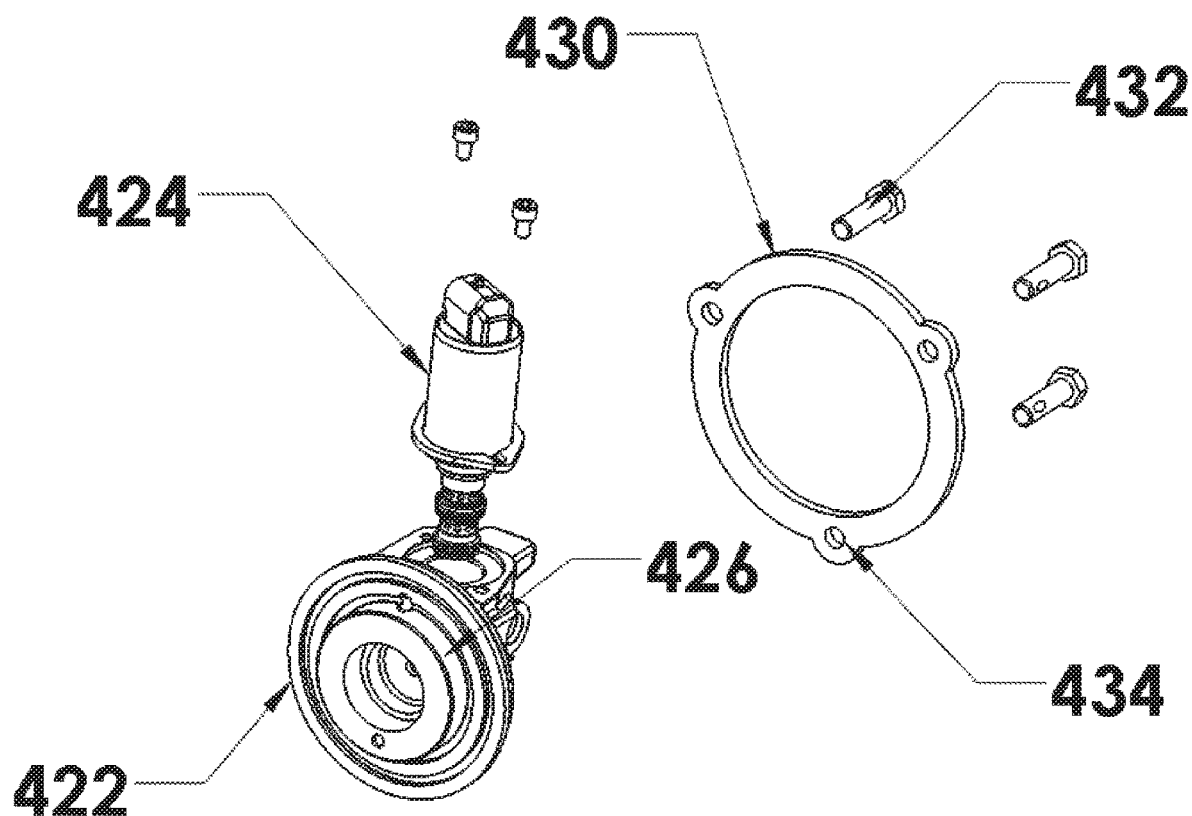
FIG. 16 is a partial perspective view of the PTO mounting assembly of FIG. 14.
Figure 17:
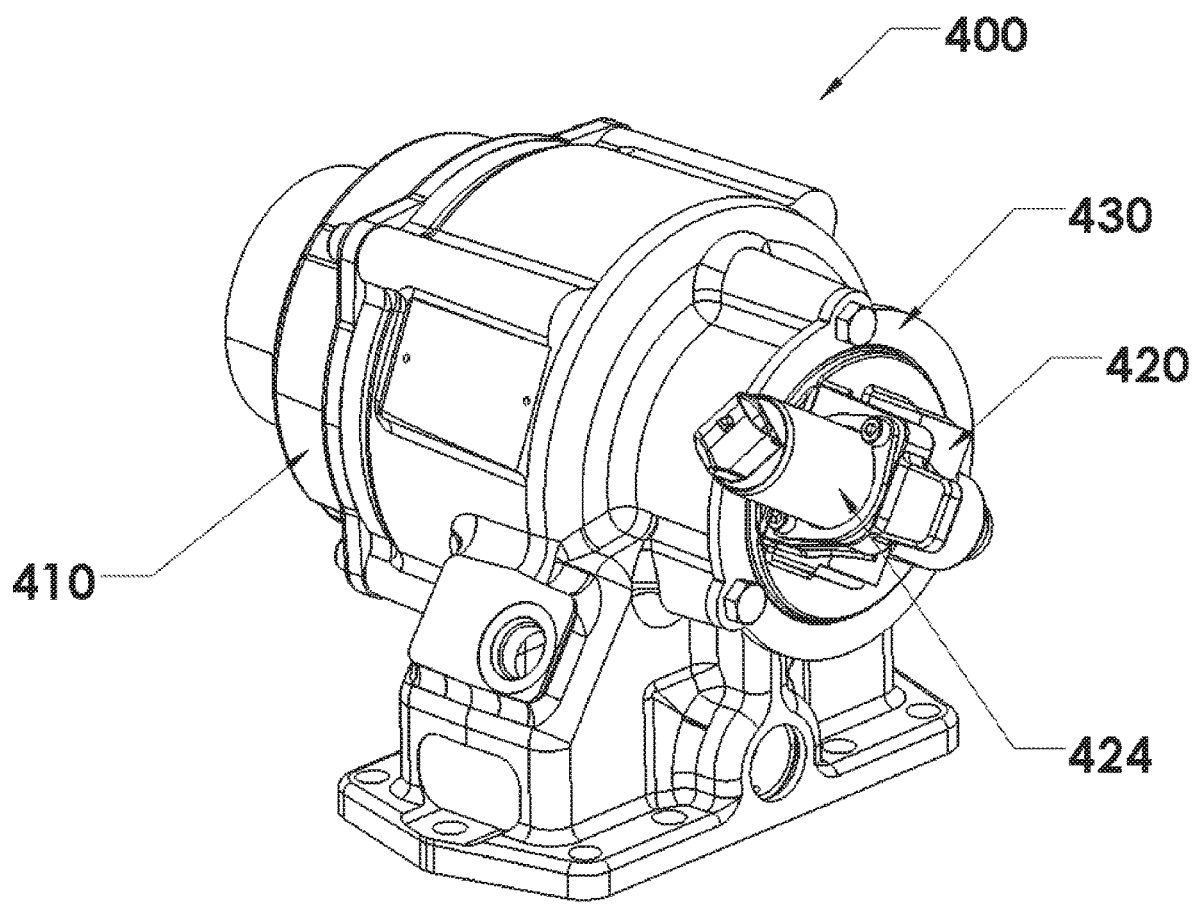
FIG. 17 is a perspective view of the PTO and the PTO mounting assembly of FIG. 14 with the mounted component in a first orientation.
Figure 18:
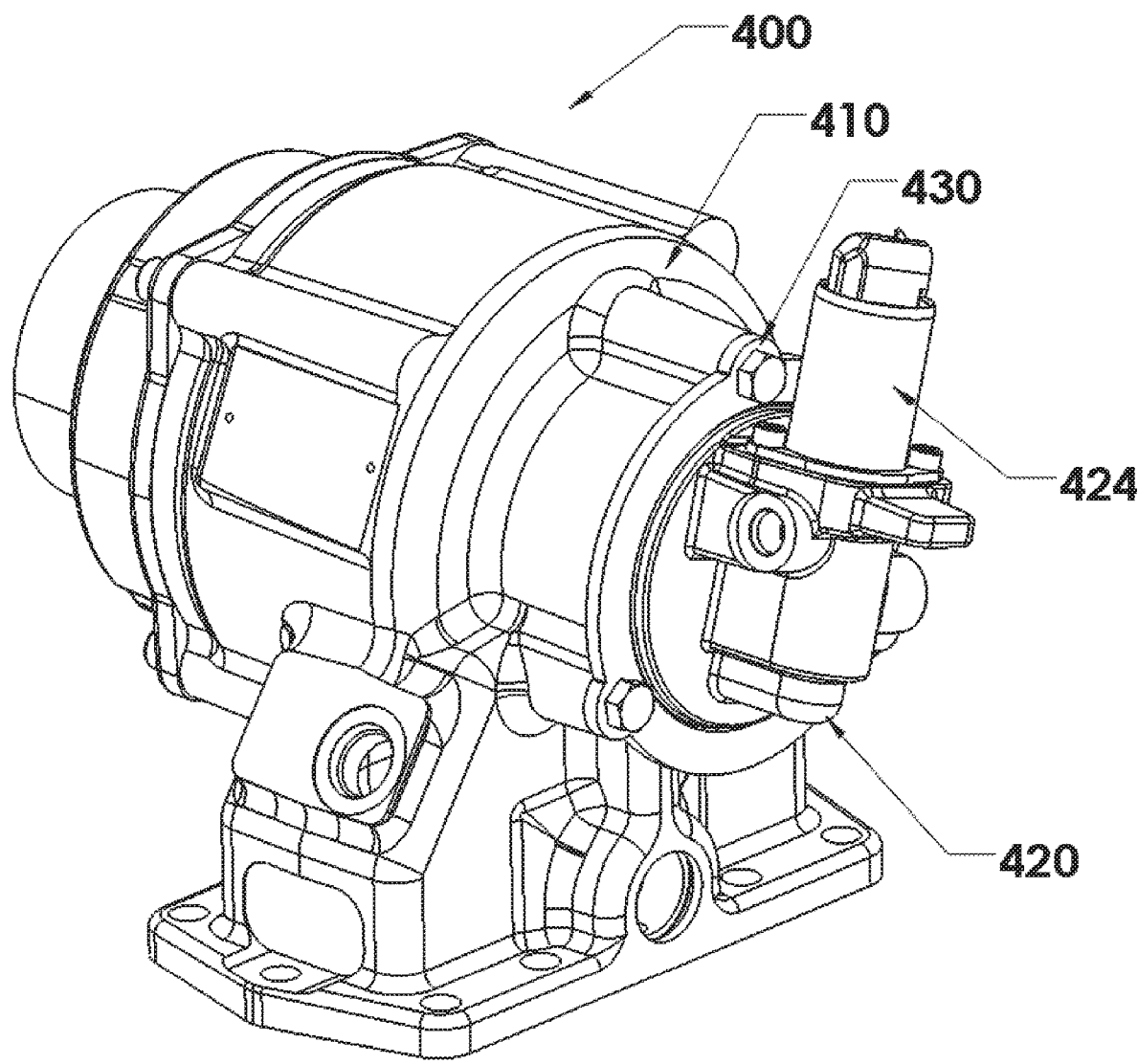
FIG. 18 is a perspective view of the PTO and the PTO mounting assembly of FIG. 14 with the mounted component in a second orientation.

Depicted in FIGS. 12-13 is an adjustable PTO mounting device 320 according to yet another embodiment of the present disclosure. Adjustable mounting device 320 includes a rotatable member 350 and a clamp 390, which may take the form of a solid clamp and which may be referred to as a stationary member. PTO 300 includes a mounting portion 303 with a mounting surface 305. Rotatable member 350 includes a PTO mounting portion 351 with a mounting surface 353 for mounting rotatable member 350 to PTO 300. Rotatable member 350 also includes mounting apertures 356 for mounting an auxiliary device to rotatable member 350. Clamp 390 includes a band 391 and a tensioning member 393.

In use, rotatable member 350 can be positioned adjacent PTO 300 such that PTO mounting portion 351 and mounting portion 303 are adjacent one another. Some embodiments include a pilot that is received in an aperture to assist alignment. For example, in the illustrated embodiment, rotatable member 350 includes a pilot 358 that is received in aperture 307 of PTO 300 to assist in aligning rotatable member 350 with PTO 300. In other embodiments, the rotatable member includes the aperture and the PTO includes the pilot. In some embodiments, a slip fit is used between the pilot and the aperture so that the pilot may be inserted into the aperture by hand, and rotatable member 350 may be rotated with respect to PTO 300 by hand (e.g., without the need for powered tools) while the pilot is received within the aperture.

Clamp 390 may be installed surrounding PTO mounting portion 351 and mounting portion 303. Once clamp 390 is mounted to PTO mounting portion 351 and mounting portion 303, tensioning member 393 may be adjusted (e.g., left loose) to allow hand rotation of rotatable member 350 with respect to PTO 300. Either before or after attaching an auxiliary device to rotatable member 350 (using, for example, mounting apertures 356), rotatable member 350 may be rotated to the appropriate orientation for installation of the auxiliary device. Once the appropriate orientation of rotatable member 350 is achieved, tensioning member 393 can be tightened to secure the rotational orientation between rotatable member 350 and PTO 300.

When tensioning member 393 is tightened, band 391 applies forces to mounting portion 303 and PTO mounting portion 351 in a similar fashion to the embodiment depicted and described in FIGS. 9-11. However, due to the more robust nature of band 391 as compared to clamp 280 (e.g., outer portion 281 and inner portion 282 of clamp 280, clamp 390 can generally apply a higher axial force ($F_a$) to mounting portions 303 and 351 than clamp 280, and can maintain the rotational orientation of rotatable member 350 under higher torque loads.

The friction between mounting surface 353 and mounting surface 305 inhibits rotation of rotatable member 350 with respect to PTO 300. Adjustable mounting device 320 secures rotatable member 350 to PTO 300 with sufficient force to resist the operational torque loads applied to rotatable member 350 by the auxiliary device. In some embodiments, adjustable mounting device 320 can hold rotatable member 350 in a desired rotational orientation without slippage while rotatable member 350 receives up to 2,000 ft./lbs. of torque. In other embodiments, adjustable mounting device 320 can hold rotatable member 350 in a desired rotational orientation without slippage while rotatable member 350 receives other amounts of torque.

In some embodiments, mounting surface 305 and/or mounting surface 353 can include one or more grooves for inserting an O-ring to seal against fluid leakage. In some embodiments, which may include embodiments with O-ring grooves in mounting surfaces 305 and/or 353, the pilot (e.g., pilot 358) and/or the aperture for the pilot (e.g., aperture 307) may include one or more grooves for receiving an O-ring to seal against fluid leakage. For example, either pilot surface 259 and/or aperture surface 208 may include a groove for receiving a seal (e.g., an O-ring).

Embodiments of the present disclosure further include systems and methods for mounting a PTO component, such as a PTO cartridge valve (e.g., an electrohydraulic cartridge valve, and which may be commonly referred to as a solenoid or a solenoid valve) or valve body, which may control engagement/disengagement of a PTO clutch or other PTO functions, to a PTO. In at least one embodiment, the systems and methods facilitate the mounting of a PTO component (e.g., cartridge valve) to a PTO in an infinite number of rotational orientations that are not incrementally constrained. Still other embodiments facilitate the mounting of a PTO component (e.g., cartridge valve) to a PTO in a finite number of rotational orientations. Still further embodiments hold a PTO component (e.g., cartridge valve) in position on the PTO while permitting adjustment of the component prior to the component being securely fastened to the PTO, such as by tightening the mounting bolts.

Depicted in FIGS. 14-18 is a mounting system 400 and a PTO component (e.g., a cartridge valve 424, which in FIGS. 14-18 is mounted to a valve body 420) according to one embodiment of the present disclosure. When used, mounting system 400 facilitates attachment of a component (e.g., a cartridge valve or a valve body) to a PTO (e.g., PTO housing 410). PTO housing 410 may include an end cap 411, which may be securely held to PTO housing 410 with fasteners 413. System 400 can also permit adjustment of the component once it has been mounted to the PTO. Embodiments of system 400 allow the component (such as the cartridge valve or valve body) to remain connected to the PTO when adjusting (or re-adjusting) the component's orientation with respect to the PTO. Embodiments of system 400 can allow the fasteners holding the component to the PTO to remain connected to the PTO when adjusting (or re-adjusting) the component's orientation. In some embodiments, system 400 allows the component to be securely and functionally mounted to the PTO in an infinite number of rotational orientations, the component being referred to as a rotatable member.

Mounting system 400 can include the component being mounted (e.g., valve body 420 and cartridge valve 424, a clamping member (e.g., clamping member 430), and a mounting portion located on the PTO (e.g., mounting portion 412). Valve body 420 includes a base 422, which is positioned between clamping member 430 and PTO mounting portion 412 when valve body 420 is being mounted to the PTO. Fasteners may be used to secure cartridge valve 424 to valve body 420.

Fasteners (e.g., bolts 432) hold clamping member 430 and base 422 to PTO mounting portion 412. When the fasteners are arranged to securely hold clamping member 430 to PTO mounting portion 412 (e.g., when the fasteners are tightened), base 422 is compressed between PTO mounting portion 412 and clamping member 430 and securely held to the PTO. When the fasteners are tightened, the orientation of base 422 and valve body 420 remain fixed with respect to the PTO during normal operation of the PTO. When the fasteners are arranged to hold clamping member 430 to PTO mounting portion 412 while allowing rotation of valve body 420 (e.g., when the fasteners are loosened, not tightened), the orientation of base 422 and valve body 420 may be adjusted (and in some embodiments adjusted by hand) while they are held to the PTO.

Mounting system 400 may also include sealing members (e.g., O-ring 436 and/or O-ring 438) to inhibit fluid (e.g., hydraulic fluid) from crossing the mating junction between valve body 420 and PTO 410. For example, an O-ring 436 and an O-ring 438 can be used together or separately and positioned between valve body 420 and PTO housing 410 to inhibit hydraulic fluid from leaking out of PTO housing 410.

Embodiments utilizing O-ring 438 positioned between the surface of PTO mounting portion 412 and base 422 have advantages in that they are positioned between two surfaces that are drawn together as fasteners 432 are tightened and are capable of providing a strong seal. However, this positioning of O-ring 438 can result in hydraulic fluid leaking past the junction between valve body 420 and PTO housing 410 if fasteners 432 are loosened too much while adjusting valve body 420.

Embodiments utilizing O-ring 436 positioned between the inner diameter of the valve body receptacle 440 in PTO housing 410 and the outer diameter (also referred to as the pilot diameter) of the valve body extension 426 that fits within receptacle 440 have advantages in that an effective seal can be maintained when fasteners 432 are loose. The location of O-ring 436 within receptacle 440 provides a seal between PTO housing 410 and valve body 420 in situations where fasteners 432 are loosened to a point where O-ring 438 would no longer provide an effective seal.

In use, a user may position base 422 between mounting portion 412 and clamping member 430 and attach the fasteners (e.g., insert bolts 432 through apertures 434 and into receptacles 414) to mount valve body 420 to PTO housing 410. By not fully tightening the fasteners (e.g., by leaving the fasteners loose or by finger tightening bolts 432), the user can rotate valve body 420 to any desired rotational orientation to, for example, avoid interference between cartridge valve 424 and another component of the transmission, engine (e.g., and engine exhaust component) or vehicle (e.g., a vehicle suspension component) to which the PTO is being mounted. Once the PTO is mounted, the valve body 420 and cartridge valve 424 can be adjusted into an appropriate orientation for operation and the fasteners tightened to fix the orientation of the valve body for operation.

In embodiments utilizing O-ring 436, O-ring 436 provides an effective seal to hold hydraulic fluid within PTO housing 410 during adjustment of valve body 420. In embodiments utilizing O-ring 438, O-ring 438 may similarly provide a seal to maintain hydraulic fluid within PTO 410; however, it may be easier for a user of these embodiments to potentially loosen fastener 432 to a point where hydraulic fluid leaks past O-ring 438.

Once the proper orientation of the component (e.g., cartridge valve 424) is achieved, the user may tighten bolts 432 and secure valve body 420 to PTO housing 410 in a particular orientation. If further adjustment is required, the user may loosen bolts 432 and rotate valve body 420 to a new orientation before tightening bolts 432 and firmly holding valve body 420 in the new orientation.

At least one advantage of embodiments of the present disclosure is the ability to attach the rotatable member (e.g., PTO component, such as cartridge valve 424) to the PTO in a manner that allows adjustment of the rotatable member before fully securing the rotatable member to the PTO, and potentially while inhibiting the leakage of hydraulic fluid from the PTO.

Another advantage of embodiments of the present disclosure is the ability to attach a rotatable member (e.g., a PTO component such as cartridge valve 424 and/or valve body 420) to the PTO using a small number of fasteners. A further advantage of embodiments of the present disclosure is the ability to mount the PTO component to the PTO in a number of orientations exceeding the number of fasteners used to mount the PTO component to the PTO, the number of potential orientations being infinite in at least some embodiments. For example, in the depicted embodiment only three (3) fasteners are required to hold the rotatable member to PTO housing 410, while the rotatable member may be mounted to PTO housing 410 in any of an infinite number of orientations.

Although base 422 is depicted as a generally circular member, alternate embodiments include bases that are of different shapes, e.g., hexagonal, octagonal, or any other regular or irregular shape capable of being fastened to the PTO by the clamping member.

Additionally, while clamping member 430 is depicted as a generally circular member, alternate embodiments include clamping members that are of different shapes, e.g., hexagonal, octagonal, or any other regular or irregular shape capable of being fastened to the PTO by the clamping member. Still further embodiments include bases and clamping members that are of different shapes while still providing the ability to adjust the base before being securely fastened to the PTO.

Moreover, while the component (e.g., valve body 420) may be adjusted to any rotational orientation with respect to the PTO, other embodiments may include a registering mechanism, such as a ratcheting mechanism (e.g., a spring clip in clamping member 430 that interacts with detents in base 422) or serrated surfaces (e.g., serrated surfaces on base 422 and complimentary serrated surfaces on mounting portion 412 and/or clamping member 430 that register with the serrated surfaces on base 422 when the fasteners are tightened) that can provide feedback to a user when the cartridge valve is oriented in one or more predetermined orientations and/or inhibit rotation of the valve body 420 when the fasteners are tightened.

Although O-rings 436 and 438 are depicted as being associated with PTO housing 410, it should be appreciated that these seals may be associated with valve body 420 or other components or auxiliary devices. Various types of seals, embossments, grooves, etc. may be generally located in the regions on PTO housing 410 depicted in FIG. 14 or on complimentary regions of valve body 420 to accommodate the O-rings. Advantages realized by these features include the ability to assist in retaining the respective O-ring during the installation process without requiring the user to hold the respective O-ring in place.

Moreover, although valve body 420 and cartridge valve 424 are depicted as separate components that are connected to one another during operation, it should be appreciated that valve body 420 and cartridge valve 424 can be constructed as a single component that is mounted to the PTO using the apparatuses and methods described herein.

Figure 19:
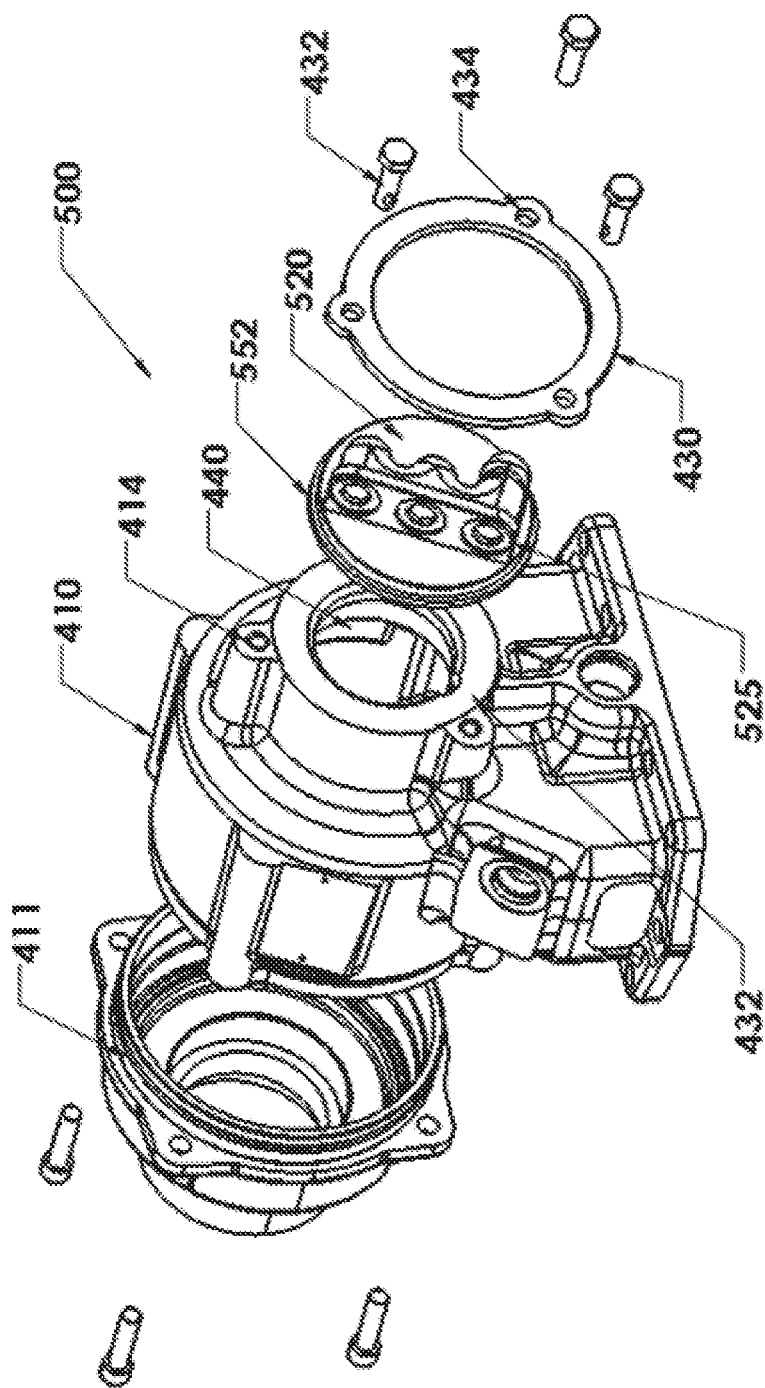
FIG. 19 is an exploded perspective view of a PTO and a PTO mounting assembly according to another embodiment of the present disclosure.
Figure 20:
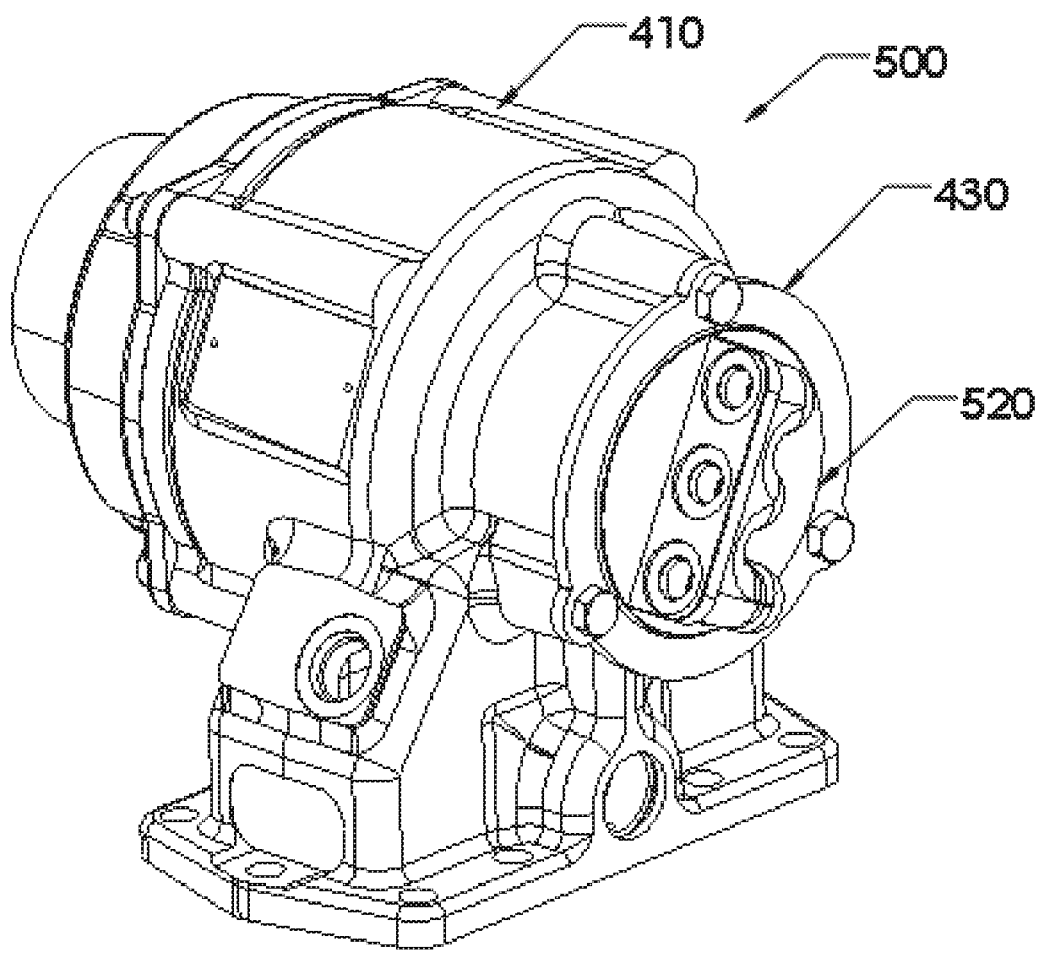
FIG. 20 is a perspective view of the PTO and the PTO mounting assembly of FIG. 19 with the mounted component in a first orientation.

Depicted in FIGS. 19 and 20 is a mounting system 500 for mounting a different type of PTO component (e.g., manifold 520) to PTO housing 510 according to another embodiment of the present disclosure. Manifold 520 includes a base 522 and hydraulic ports 525 to which hydraulic fluid lines may be connected. The operation and use of mounting system 500 is similar to the operation and use of mounting system 400 as described above. Elements depicted in FIGS. 19 and 20 with the same reference numerals as those depicted in FIGS. 14-18 function similarly to or the same as the elements in FIGS. 14-18 except as shown and/or described. When fasteners 432 are in an untightened state, manifold 520 may be rotated to an appropriate orientation for clean and efficient routing of hydraulic lines and/or to avoid interference with various other PTO, transmission, engine or vehicle components. Once the desired orientation is achieved, fasteners 432 may be tightened to hold manifold 520 in the desired orientation. As should be understood, different types of auxiliary devices, including PTO components, may be mounted to a PTO using the systems, methods and devices disclosed herein.

Various Aspects of Different Embodiments of the Present Disclosure are Expressed in Paragraphs X1, X2, and X3, as Follows:

X1. One embodiment of the present disclosure includes an apparatus, comprising: a stationary member configured to attach to one of a power takeoff and an auxiliary device; and a rotatable member configured to attach to the other of a power takeoff and an auxiliary device, wherein the rotatable member and the stationary member have two orientations with respect to one another, a disengaged orientation permitting rotation of the rotatable member with respect to the stationary member while the stationary member is attached to one of the power takeoff and the auxiliary device, and an engaged orientation inhibiting rotation of the rotatable member with respect to the stationary member while the stationary member is attached to one of the power takeoff and the auxiliary device.

X2. Another embodiment of the present disclosure includes a method for attaching an auxiliary device to a power takeoff, comprising: rotationally coupling a power takeoff and a stationary member; permitting rotation of a rotatable member with respect to the stationary member after said rotationally coupling a power takeoff and a stationary member; inhibiting rotation of the rotatable member with respect to the stationary member.

X3. Another embodiment of the present disclosure includes an apparatus for attaching an auxiliary device to a power takeoff, comprising: a first member configured to attach to a power takeoff; a second member configured to attach to an auxiliary device; means for permitting rotation the first and second members with respect one another when the first member is attached to the power takeoff; and means for inhibiting rotation of the first and second members with respect to one another when the first member is attached to the power takeoff and the second member is attached to the auxiliary device.

Yet other embodiments include the features described in any of the previous statements X1, X2, or X3, as combined with (i) one or more of the previous statements X1, X2, or X3, (ii) one or more of the following aspects, or (iii) one or more of the previous statements X1, X2, or X3 and one or more of the following aspects:

Wherein the stationary member is captured by the rotatable member and the power takeoff when the stationary member is mounted to the power takeoff.

Wherein the stationary member includes a pilot portion configured to guide the auxiliary device into alignment with the rotatable member while permitting rotation of the pilot portion and the auxiliary device with respect to one another.

Wherein the rotatable member surrounds the stationary member.

Wherein the stationary member includes at least one spline and the rotatable member includes at least one spline, and wherein the splines are configured to cooperatively engage with one another to inhibit rotation of the rotatable member with respect to the stationary member when the rotatable member and the stationary member are in the engaged orientation.

A power takeoff, where in the stationary member is connected to the power takeoff.

Wherein the rotatable member moves away from the PTO and toward the auxiliary device when moving from the disengaged orientation to the engaged orientation.

Wherein the stationary member and the rotatable member are held in the engaged orientation when the stationary member is attached to the PTO and the rotatable member is attached to the auxiliary device.

The disengaged orientation permits rotation of the rotatable member with respect to the stationary member while the stationary member is attached to the power takeoff and the auxiliary device is not attached to the rotatable member.

The engaged orientation inhibits rotation of the rotatable member with respect to the stationary member while the stationary member is attached to the power takeoff and the auxiliary device is attached to the rotatable member.

Wherein connection of the rotatable member to the auxiliary device inhibits the rotatable member and the stationary member from transitioning to the disengaged orientation from the engaged orientation.

Wherein connection of the rotatable member to the auxiliary device prevents the rotatable member and the stationary member from transitioning to the disengaged orientation from the engaged orientation.

Capturing the rotatable member between the power takeoff and the stationary member.

Inhibiting removal of the rotatable member from the stationary member when the stationary member and the power takeoff are coupled to one another.

Permitting rotation includes permitting rotation of the rotatable member by hand with respect to the stationary member.

Piloting the auxiliary device into alignment with the stationary member while permitting rotation of the auxiliary device with respect to the stationary member.

Permitting rotation of the auxiliary device with respect to the stationary member includes permitting hand rotation of the auxiliary device with respect to the stationary member.

Rotationally engaging includes moving the rotational and stationary members in a linear direction with respect to one another.

Rotationally coupling the rotatable member and an auxiliary device occurs after said inhibiting rotation.

Rotationally coupling the rotatable member and an auxiliary device occurs after said rotationally coupling a power takeoff and a stationary member.

Permitting rotation of a rotatable member with respect to the stationary member occurs when the stationary member and the rotatable member are in a rotationally disengaged position in relation to one another.

Inhibiting rotation of the rotatable member with respect to the stationary member occurs while the stationary member and the rotatable member are in a rotationally engaged position in relation to one another.

Wherein said permitting rotation of a rotatable member with respect to the stationary member occurs when the stationary member and the rotatable member are in a rotationally disengaged position in relation to one another; and wherein said inhibiting rotation of the rotatable member with respect to the stationary member occurs while the stationary member and the rotatable member are in a rotationally engaged position in relation to one another.

Rotationally coupling the rotatable member and an auxiliary device, wherein said rotationally coupling the rotatable member and the auxiliary device inhibits transition of the rotatable member and the stationary member from the engaged position to the disengaged position.

Wherein inhibiting rotation of the rotatable member with respect to the stationary member includes engaging one or more surface features on the stationary member with one or more surface features on the rotatable member.

Rotationally coupling the rotatable member and an auxiliary device inhibits transition of the rotatable member and the stationary member from the engaged position to the disengaged position.

Means for piloting the auxiliary device into alignment with the power takeoff while allowing hand rotation of the auxiliary device with respect to the power takeoff.

Means for capturing the second member with the power takeoff and the first member when the power takeoff and the first member are attached to one another.

One or more surface features on the first member and one or more surface features on the second member, wherein the surface features surfaces cooperate to inhibit rotation of the first and second members in relation to one another.

Wherein the one or more surface features on the first member are one or more splines, and the one or more surface features on the second member are one or more splines, and wherein the splines on the first and second members are in a cooperative interlocking relationship with one another when rotation between the first and second members is inhibited.

Wherein the rotatable member includes a component base, wherein the component base is captured by the stationary member and the power takeoff when the stationary member is mounted to the power takeoff.

Wherein the stationary member is a clamping member, and wherein the rotatable member is captured by the clamping member and the power takeoff when the clamping member is mounted to the power takeoff.

Wherein the at least one fastener and the stationary member hold the rotatable member to the power takeoff while permitting hand rotation of the rotatable member with respect to the power takeoff when the at least one fastener is not tightened.

Wherein the at least one fastener, the stationary member and the rotatable member define a plurality of potential orientations in which the rotatable member may be held to the power takeoff in a fixed manner when the at least one fastener is tightened, and wherein the number potential orientations exceeds the number of fasteners.

Wherein at least one fastener and the clamping member hold the component base to the power takeoff in a first orientation that remains fixed when the at least one fastener is tightened; and wherein the at least one fastener and the clamping member hold the component base to the power takeoff while permitting rotation of the component base with respect to the PTO when the at least one fastener is not tightened.

Wherein the at least one fastener, the stationary member and the rotatable member define an infinite number of potential orientations in which the rotatable member may be held to the power takeoff in a fixed manner when the at least one fastener is tightened.

Wherein the at least one fastener and the stationary member hold the rotatable member to the power takeoff in a second orientation that remains fixed when the at least one fastener is tightened, and wherein the second orientation is different from the first orientation.

Wherein the clamp includes a tensioning member, wherein the clamp adopts the second orientation when the tensioning member is tightened, wherein the clamp adopts the first orientation when the tensioning member is loosened, and wherein the second orientation is different than the first orientation.

Wherein the clamp includes a tensioning member, wherein the clamp and the rotatable member adopt the engaged orientation when the tensioning member is tightened, and wherein the clamp and the rotatable member adopt the disengaged orientation when the tensioning member is loosened.

Wherein the rotatable member is captured by the stationary member and the power takeoff when the stationary member is mounted to the power takeoff.

Wherein a plurality of fasteners connect to a power takeoff and hold the base to the power takeoff in a first orientation selected from a plurality of potential orientations while inhibiting rotation of the base to a second orientation different from the first, the second orientation being selected from the plurality of potential orientations; and wherein the number of potential orientations is greater than the number of fasteners.

Wherein at least one fastener and a clamping member hold the component base to the power takeoff while permitting hand rotation of the component base with respect to the power takeoff when the at least one fastener is not tightened.

Wherein at least one fastener and a stationary member hold the rotatable member to the power takeoff while permitting rotation of the rotatable member with respect to the power takeoff when the at least one fastener is not tightened.

Wherein the rotatable member includes a component base.

Wherein the stationary member is a clamping member.

Wherein at least one fastener, a clamping member and a component base define a plurality of potential orientations in which the component may be held to the power takeoff in a fixed manner when the at least one fastener is tightened, and wherein the number potential orientations exceeds the number of fasteners.

Wherein at least one fastener and the clamping member hold the component base to the power takeoff in a second orientation that remains fixed when the at least one fastener is tightened, and wherein the second orientation is different from the first orientation.

Wherein a plurality of fasteners is configured to hold the base to the power takeoff in the first orientation while preventing rotation of the base to a second orientation during normal power takeoff operation.

A clamping member, wherein a plurality of fasteners connect to the clamping member and compress the base between the power takeoff and the clamping member when the fasteners are tightened.

Wherein a plurality of fasteners permits rotation of the base to the second orientation when at least one fastener is not tightened.

Wherein the second member includes a component base, wherein the component base is captured by the first member and the power takeoff when the first member is mounted to the power takeoff.

Wherein the second member includes a power takeoff mounting portion, and wherein the first member is a clamp configured and adapted to receive the power takeoff mounting portion of the second member and a portion of the power takeoff.

Reference systems that may be used herein can refer generally to various directions (e.g., upper, lower, forward, stationary and rotatable rearward), which are merely offered to assist the reader in understanding the various embodiments of the disclosure and are not to be interpreted as limiting. Other reference systems may be used to describe various embodiments, such as referring to the direction of projectile movement as it exits the firearm as being up, down, rearward or any other direction.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

What is claimed:

1. An apparatus, comprising:
a stationary member configured to removably attach to one of a power takeoff and an auxiliary device; and
a rotatable member configured to attach to the other of a power takeoff and an auxiliary device;
wherein the rotatable member and the stationary member have two orientations with respect to one another,
a disengaged orientation permitting rotation of the rotatable member with respect to the stationary member while the stationary member is attached to one of the power takeoff and the auxiliary device, and
an engaged orientation inhibiting rotation of the rotatable member with respect to the stationary member while the stationary member is attached to one of the power takeoff and the auxiliary device.

2. The apparatus of claim 1, wherein the rotatable member is captured by the stationary member and the power takeoff when the stationary member is mounted to the power takeoff.

3. The apparatus of claim 1, wherein the stationary member is connected to the power takeoff.

4. The apparatus of claim 1, wherein the auxiliary device is configured to receive power from the power takeoff when the auxiliary device is coupled to the power takeoff.

5. The apparatus of claim 1, wherein the rotatable member is configured and adapted to connect to the auxiliary device, and wherein the rotatable member includes a power takeoff mounting portion configured and adapted to connect to the power takeoff.

6. The apparatus of claim 5, wherein the stationary member is a clamp configured and adapted to receive the power takeoff mounting portion of the rotatable member and a portion of the power takeoff.

7. The apparatus of claim 6, wherein the clamp includes a tensioning member, wherein the clamp and the rotatable member adopt the engaged orientation when the tensioning member is tightened, and wherein the clamp and the rotatable member adopt the disengaged orientation when the tensioning member is loosened.

8. The apparatus of claim 5, wherein, in the disengaged orientation, the power takeoff mounting portion of the rotatable member is held adjacent the power takeoff while permitting hand rotation of the rotatable member with respect to the power takeoff; and
wherein, in the engaged orientation, the power takeoff mounting portion of the rotatable member is held adjacent the power takeoff while preventing rotation of the rotatable member with respect to the power takeoff.

9. The apparatus of claim 1, further comprising at least one fastener configured to connect to the power takeoff and hold the stationary member to the power takeoff.

10. The apparatus of claim 9, wherein the at least one fastener and the stationary member hold the rotatable member to the power takeoff in the engaged orientation when the at least one fastener is tightened; and
wherein the at least one fastener and the stationary member hold the rotatable member to the power takeoff in the disengaged orientation when the at least one fastener is not tightened.

11. The apparatus of claim 9 wherein the at least one fastener, the stationary member and the rotatable member define a plurality of potential orientations in which the rotatable member may be held to the power takeoff in a fixed manner when the at least one fastener is tightened, and wherein the number of potential orientations exceeds the number of fasteners.

12. The apparatus of claim 1, wherein the stationary member is a clamping member, wherein the rotatable member is captured by the clamping member and the power takeoff when the clamping member is mounted to the power takeoff.

13. The apparatus of claim 12, wherein the clamping member and the rotatable member define an infinite number of potential orientations in which the rotatable member may be held to the power takeoff in a fixed manner when clamping member and rotatable member adopt the engaged orientation.

* * * * *